(12) United States Patent
Fujimoto

(10) Patent No.: US 7,667,581 B2
(45) Date of Patent: Feb. 23, 2010

(54) PEDESTRIAN DETECTOR AND DETECTING METHOD USING CHANGE OF VELOCITY OF OBJECT IN IMAGE

(75) Inventor: Kazumi Fujimoto, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 349 days.

(21) Appl. No.: 11/798,714

(22) Filed: May 16, 2007

(65) Prior Publication Data

US 2007/0274566 A1    Nov. 29, 2007

(30) Foreign Application Priority Data

May 24, 2006    (JP)    ............................ 2006-143612

(51) Int. Cl.
*B60C 23/00* (2006.01)
(52) U.S. Cl. .................................... 340/436; 340/425.5
(58) Field of Classification Search ................ 340/435, 340/436, 425.5, 944
See application file for complete search history.

(56) References Cited

U.S. PATENT DOCUMENTS 6,337,637 B1 * 1/2002 Kubota et al. ............... 340/901
6,956,469 B2 * 10/2005 Hirvonen et al. ............ 340/435

FOREIGN PATENT DOCUMENTS

JP    2004-056763 A    2/2004

* cited by examiner

*Primary Examiner*—Jeffery Hofsass
(74) *Attorney, Agent, or Firm*—Foley & Lardner LLP

(57) ABSTRACT

A pedestrian detecting method including: picking up an image of a scene in front of a vehicle; extracting characteristic points from the picked up image; calculating a velocity at which, and a direction in which, each of pixels representing the respective characteristic points moves in the image; expressing coordinates of each of the pixels in a coordinate system corresponding to an overhead view; determining whether the characteristic points represent a two-dimensional object or a three-dimensional object, and if it is determined that they represent the three-dimensional object, whether or not the three-dimensional object is a moving object, on the basis of the calculated velocity and direction of each of the pixels and the coordinates thereof in the overhead view; and determining whether or not the moving object is a pedestrian on the basis of change in the velocity at which the moving object moves in the image.

15 Claims, 14 Drawing Sheets

(a) BINARIZED (b) THINNED (c) EXPANDED

PEDESTRIAN DETECTOR AND DETECTING METHOD USING CHANGE OF VELOCITY OF OBJECT IN IMAGE

BACKGROUND OF THE INVENTION

1. Field of the Invention

The present invention relates to a pedestrian detector and a pedestrian detecting method.

2. Description of the Related Art

In general, there have been proposed a large number of moving object detectors for, and moving object detecting methods of, detecting moving objects such as pedestrians and vehicles by use of an optical flow (image velocity information) from images picked up by an in-vehicle camera.

Japanese Patent Application Laid-open Publication No. 2004-56763 discloses a moving object detecting method in which, an optical flow is first obtained from images picked up, and subsequently on the basis of how moving objects move, an optical flow of the background extracted from the images picked up is compared with an optical flow of the whole of the image picked up, whereby moving objects are detected.

SUMMARY OF THE INVENTION

In a moving object detector and a moving object detecting method of the foregoing type, an optical flow of the background need to be calculated for the purpose of detecting moving objects. To this end, a space model representing a space in front of a host vehicle is assumed, and the optical flow of the background is calculated on the basis of this space model and movement of the host vehicle. However, this scheme brings about a problem that, in a case where the space model needs to be assumed in a very short length of time, the assumption is less accurate so that an optical flow is detected less accurately, and that it is accordingly difficult to detect moving objects with high accuracy. Particularly, the scheme has a problem that it is difficult to detect pedestrians with high accuracy. That is because pedestrians move slowly, and because pedestrians behave irregularly.

The present invention has been made with the foregoing problems taken into consideration. An object of the present invention is to provide a pedestrian detector and a pedestrian detecting method, in which an image picked up by a camera is processed to detect a moving object, and change in motion particular to a pedestrian is detected from change in motion velocity of the detected moving object, to thereby detect a pedestrian with high accuracy.

A first aspect of the present invention is a pedestrian detector comprising: an image pick up unit configured to pick up an image of a scene in front of a host vehicle; and a controller including: a characteristic point extractor configured to extract characteristic points from the image which has been picked up by the image pick up unit; a movement information calculator configured to calculate a velocity at which, and a direction in which, each of pixels representing the respective characteristic points moves in the image, and to output the velocity and the direction as movement information; a coordinate converter configured to express coordinates of each of the pixels in a coordinate system corresponding to an overhead view representing the image of the scene in front of the host vehicle obtained by coordinate conversion; an object attribute determinator configured to determine that the characteristic points represent any one of a two-dimensional object or a three-dimensional object, and in a case where it is determined that the characteristic points represent the three-dimensional object, whether or not the three-dimensional object is a moving object, on the basis of the coordinates of each of the pixels in the overhead view, and on the basis of the movement information on each of the pixels; and a pedestrian determinator configured to determine whether or not the moving object is a pedestrian on the basis of change in the velocity at which the moving object moves in the image in a case where it is determined that the characteristic points represent the moving object.

A second aspect of the present invention is a pedestrian detecting method comprising: picking up an image of a scene in front of a host vehicle; extracting characteristic points from the image which has been picked up; calculating a velocity at which, and a direction in which, each of pixels representing the respective characteristic points moves in the image, and outputting the velocity and the direction as movement information; expressing coordinates of each of the pixels in a coordinate system corresponding to an overhead view representing the image of the scene in front of the host vehicle obtained by coordinate conversion; determining whether the characteristic points represent any one of a two-dimensional object and a three-dimensional object, and in a case where it is determined that the characteristic points represent the three-dimensional object, whether or not the three-dimensional object is a moving object, on the basis of the coordinates of each of the pixels in the overhead view, and on the basis of the movement information on each of the pixels; and determining whether or not the moving object is a pedestrian on the basis of change in the velocity at which the moving object moves in the image in a case where it is determined that the characteristic points represent the moving object.

BRIEF DESCRIPTION OF THE DRAWINGS

The invention will now be described with reference to the accompanying drawings wherein.

DESCRIPTION OF THE PREFERRED EMBODIMENT

Figure 1:
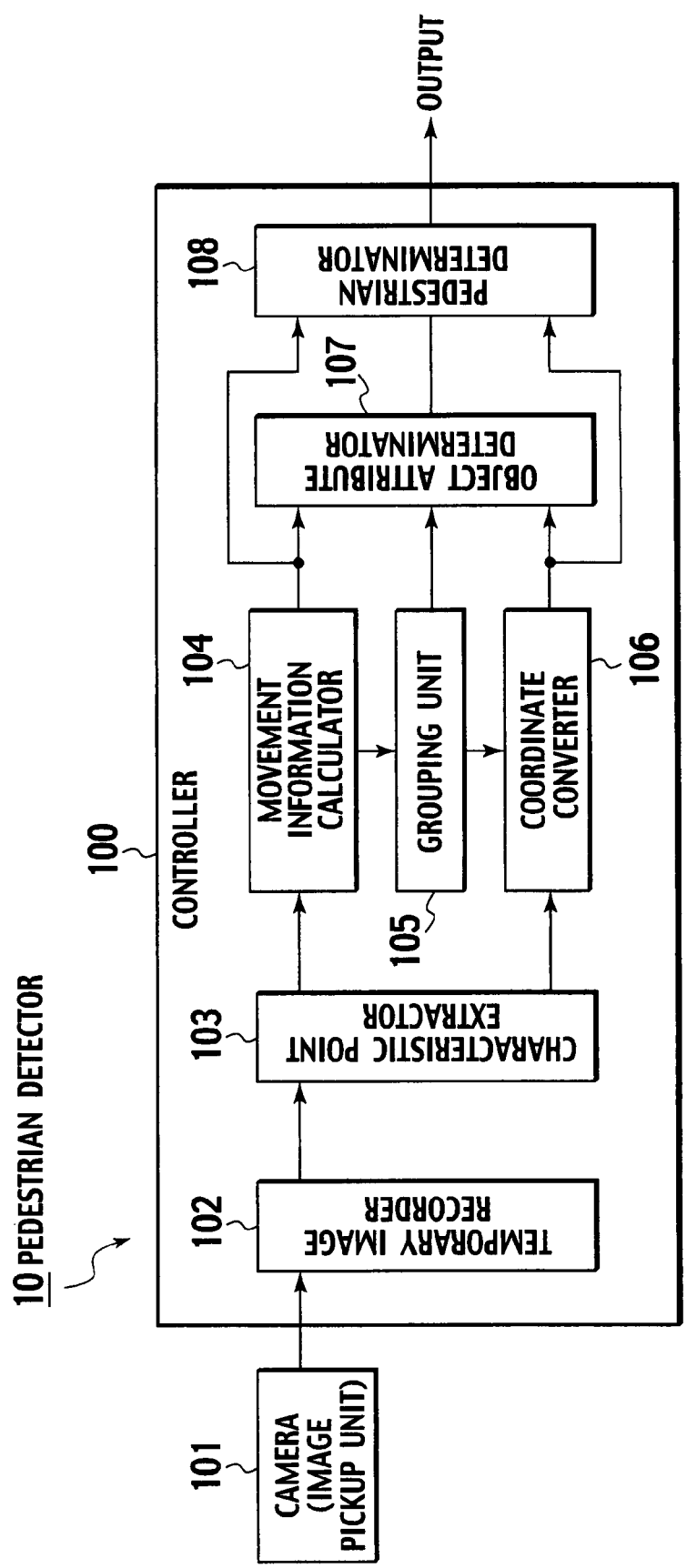
FIG. 1 is a block diagram showing an example of a configuration of an embodiment of the present invention.

An embodiment of the present invention will be explained below with reference to the drawings, wherein like members are designated by like reference characters.

FIG. 1 is a block diagram showing an example of a configuration of a moving object detector according to an embodiment of the present invention.

A pedestrian detector 10 includes a camera 101 and a controller 100. The camera 101 is mounted on a vehicle, and constitutes an image pickup unit which picks up an image of the scene in front of the vehicle. The controller 100 includes a temporary image recorder 102, a characteristic point extractor 103, a movement information calculator 104, a grouping unit 105, a coordinate converter 106, an object attribute determinator 107 and a pedestrian determinator 108. The temporary image recorder 102 is configured to temporarily record the image which has been picked up by the camera 101. The characteristic point extractor 103 is configured to extract characteristic points by processing the image which is stored in the temporary image recorder 102. The movement information calculator 104 is configured to calculate a velocity at which, and a direction in which, each of pixels representing the respective characteristic points extracted by the characteristic point extractor 103 moves in the image, and outputs the velocity and the direction as movement information. The grouping unit 105 is configured to group the pixels representing the respective characteristic points by use of an index. What is used as the index is the velocity of each of the pixels which has been calculated by the movement information calculator 104. The coordinate converter 106 is configured to select specific pixels out of the pixels which have been grouped by the grouping unit 105, and to thus express the specific pixels in a coordinate system corresponding to an overhead view representing the image of the scene in front of the vehicle obtained by coordinate conversion. The object attribute determinator 107 is configured to determine whether the characteristic points represent a two-dimensional object or a three-dimensional object on the basis of coordinates of the pixels expressed in the coordinate system obtained by the coordinate conversion by the coordinate converter 106, and on the basis of the movement information on the characteristic points which has been calculated by the movement information calculator 104. In addition, in a case where the characteristic points represent a three-dimensional object, the object attribute determinator 107 determines whether or not the three-dimensional object is a moving object. In a case where the characteristic points represent a moving object, the pedestrian determinator 108 determines whether or not the moving object is a pedestrian on the basis of change in the velocity at which the moving object moves.

The camera 101 is that which includes image pickup elements. Examples of the image pickup elements include CCD and CMOS. The camera 101 successively picks up an image of the scene in front of the vehicle, and outputs the images thus picked up to the temporary image recorder 102 for each frame.

Figure 2:
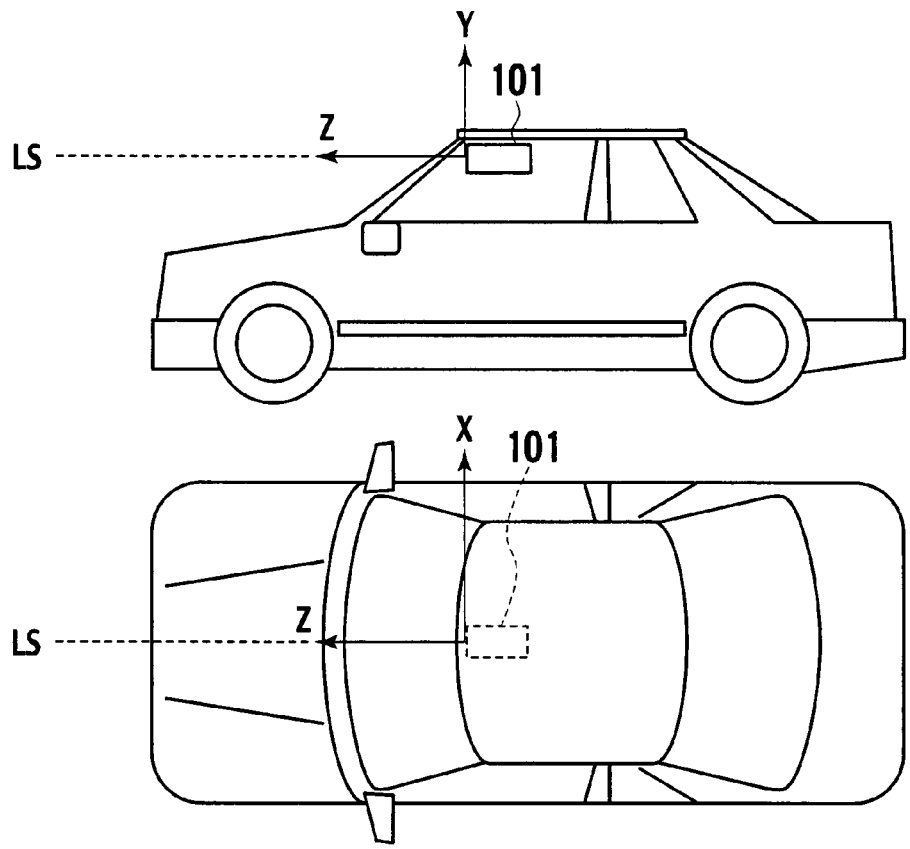
FIG. 2 is a diagram showing an example of how a camera is mounted on a vehicle.

The images picked up by the camera 101 are temporarily stored in the temporary image recorder 102. In this point, as shown in FIG. 2, the camera 101 is installed in an upper front (for example, an inside rear-view mirror) in the vehicle compartment. The optical axis LS of the camera 101 is set up so that the optical axis LS should be directed to the forward front of the vehicle (in the Z direction). The horizontal axis X of the image pickup face (not illustrated) is set in parallel with the road surface. In addition, the vertical axis Y of the image pickup face (not illustrated) is set up perpendicular to the road surface.

Figure 3:
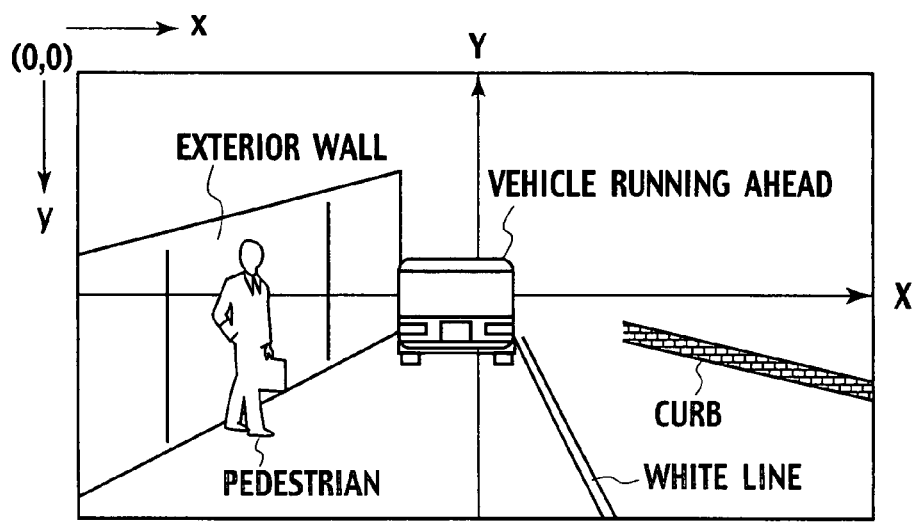
FIG. 3 is a diagram showing an example of an image picked up by the camera.

FIG. 3 shows an example of an image (image of the scene in front of the host vehicle) picked up by the camera 101. The image picked up by the camera 101 is expressed in an x-y plane coordinate system as follows. The upper left corner of the image represents the origin of ordinates. The x-axis starts from the origin of ordinates, and extends from the left to the right. The y-axis starts from the origin of the ordinates, and extends from the top to the bottom. It should be noted that the image picked up includes lane boundary lines, a pedestrian moving from the left to the right, and a vehicle running in front of a host vehicle. Examples of the lane boundary lines include a curb and a white line which are placed in the right side of the lane, and an exterior wall which is placed in the left side of the lane.

Figure 4:
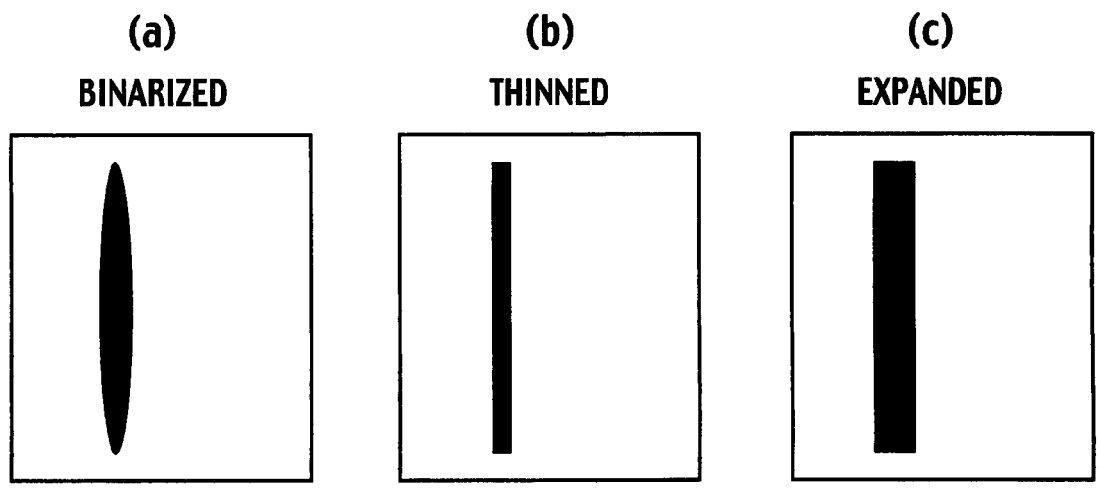
FIG. 4 is a diagram showing examples of a process to be carried out for obtaining an edge image by normalizing an extracted edge.

The characteristic point extractor 103 reads the image picked up by the camera 101 from the temporary image recorder 102, and binarizes the picked up image thus read by use of a predetermined threshold value. The characteristic point extractor 103 extracts edges of each object existing in the image. FIG. 4(*a*) shows an example of a vertically directed edge thus extracted. Subsequently, a thinning process is applied to each of the extracted edges, and thus the width of each of the extracted edges is narrowed down. Thereby, the center of the edge in the vertical direction is set up accurately (refer to FIG. 4(*b*)). Thereafter, the thinned edge is expanded in the horizontal direction so that the thinned edge has a predetermined width, for example, a width equivalent to three pixels (refer to FIG. 4(*c*)). This manipulation makes it possible to normalize the extracted edges, and to accordingly obtain an image on each of the edges having a uniform width.

The movement information calculator 104 updates a counter value registered by a pixel counter for counting pixels corresponding to each of the edges. In this respect, the pixel counter is that sets up for each pixel. In a case where a pixel corresponds to an edge, the counter value registered by the pixel counter is added by +1. In a case where a pixel corresponds to no edge, the counter value registered by the pixel counter becomes zero, and thus is initialized. A counter value updating process of this kind is carried out for each frame successively picked up by the camera 101. This process makes larger a counter value which is registered by the pixel counter for a pixel corresponding to an edge for a longer period of time. The process makes smaller a counter value which is registered by the pixel counter for a pixel corresponding to an edge for a shorter period of time. Change in a counter value registered by the pixel counter represents a direction in which a corresponding edge moves, and an amount of movement of the corresponding edge. For this reason, a direction in which, and a velocity at which, the edge moves on the picked up image can be calculated from the counter value.

Figure 5:
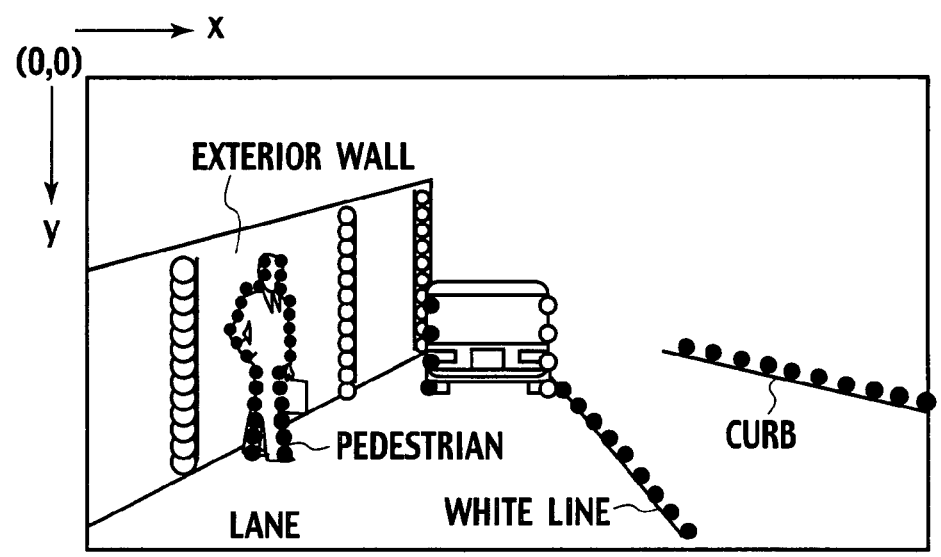
FIG. 5 is a diagram showing an example of a velocity image.

Subsequently, components of velocities respectively of edges existing in the picked up image are classified into predetermined classification values, and thereby a velocity image is created. In a velocity image according to the present embodiment, a pixel representing an edge whose velocity has been detected is expressed with a circled point as shown in FIG. 5. The faster a pixel moves, the larger circled point the pixel representing the edge is expressed with. In addition, a velocity of a pixel representing an edge moving to the right is expressed with a black circled point, and a velocity if a pixel representing an edge moving to the left is expressed with a white circled point. Thereby, a direction in which an edge moves is clarified. In FIG. 5, a velocity at which an edge moves to the right in the image is detected from each of a curb and a white line located in the right of the lane in which a host vehicle is running. A velocity at which an edge moves to the left in the image is detected from an exterior wall located in the left of the lane in which the host vehicle is running. In addition, a velocity at which an edge moves to the right in the image is detected from a pedestrian who is moving from the left to the right of the lane. Furthermore, a velocity at which an edge moves to the right in the image is detected from the left end of the vehicle running faster than, and in front of, the host vehicle. A velocity at which an edge moves to the left in the image is detected from the right end of the vehicle running faster than, and in front of, the host vehicle.

Figure 6:
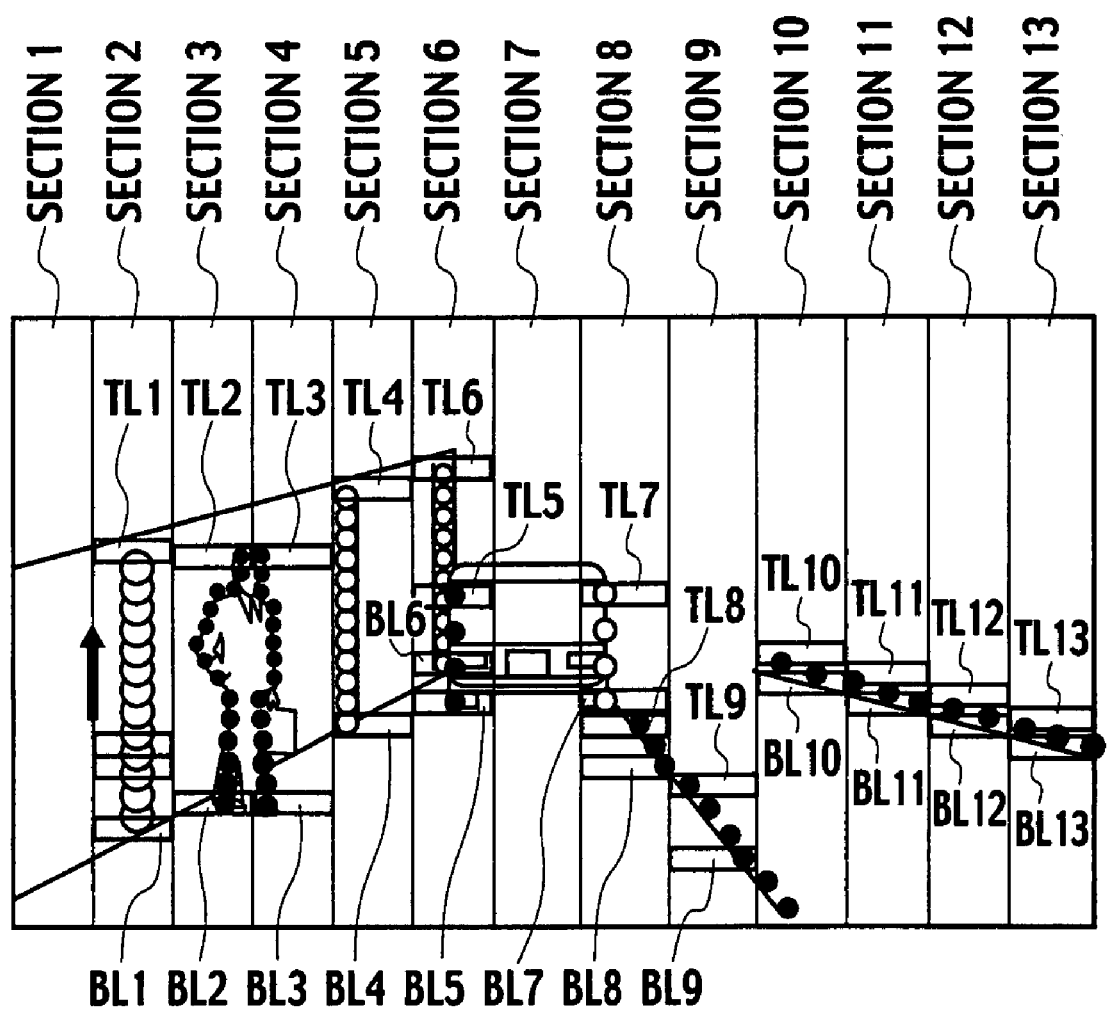
FIG. 6 is a diagram showing an example in which a plurality of sections are set up on the velocity image, pixels whose velocities are within a predetermined range in each of the sections are grouped into a single group, and thereby the bottom end point and the top end point of the group are detected.

The grouping unit 105 sets up a plurality of sections into which the velocity image is vertically divided, for the purpose of extracting a three-dimensional object from the calculated velocity image. Specifically, as shown in FIG. 6, a plurality of sections are set up on the velocity image, and thus the velocity image is vertically divided into the plurality of vertically extending sections of equal width (hereinafter referred to as "sections").

Subsequently, pixels whose velocities are within a predetermined range, and which are next to each other in the vertical direction, are grouped into a single group in each of the sections. Specifically, each of the sections is scanned from the bottom to the top of the image. In a case where a pixel with a velocity exists in a section, the velocity of the pixel is compared with a velocity of a pixel with the velocity, which is next to, and above, the former pixel. Through the comparison, the difference in velocity between the two pixels is calculated. In a case where the difference in velocity is not larger than a threshold value ΔVG, it can be assumed that one of the two pixels represents an object which moves at the same velocity as the host vehicle runs, and that the other of the two pixels represents an object which moves at the same velocity as the host vehicle runs. For this reason, it is determined that the two pixels represent the same object, and thus the two pixels are grouped into the same group. After that, the top end level position (uppermost portion) in the pixels grouped into the same group and the bottom end level position (lowermost portion) in the same group are detected. Through carrying out this process, the bottom end levels BL1 to BL13 and the top end levels TL1 to TL13 are detected as shown in FIG. 6.

The coordinate converter 106 finds bottom end points BP1 to BP13 (refer to FIG. 7) respectively in the bottom end levels BL1 to BL13, and top end points TP1 to TP13 (refer to FIG. 7) respectively in the top end levels TL1 to TL13. The bottom end points BP1 to BP13 have their own x-axis values. Each of the x-axis values of the respective bottom end points BP1 to BP13 is obtained by averaging x-axis values representing pixels belonging to the corresponding one of the bottom end levels BL1 to BL13. Each of the x-axis values of the respective top end points TP1 to TP13 is obtained by averaging x-axis values representing pixels belonging to the corresponding one of the top end levels TL1 to TL13. Positions representing these bottom end points BP1 to BP13 and top end points TP1 to TP13 are expressed in the coordinate system in the Z-X plane having a defined ranges and obtained by coordinate conversion (coordinate conversion of coordinates (x, y) in the x-y plane to coordinates (Z, X) in the Z-X plane will be hereinafter referred to as view conversion from time to time).

Coordinates (x, y) of each of the points TP1 to TP13 and the points BP1 to BP13 in the x-y plane are converted to its corresponding coordinates (Z, X) in the Z-X plane by $$Z = Ch/\text{TAN}\{Tr + (y - Ih/2) \times PYr\} \quad \text{Formula 1}$$

$$X = Z \times \text{TAN}\{(x - Iw/2) \times PXr\} \quad \text{Formula 2}$$

where Ch (m) denotes the height of the camera from the road surface; Tr (radian), the depression angle of the camera; Ih, the vertical size of an image; Iw, the lateral size of the image; PYr (radian), angular resolution per pixel in the height direction; and PXr (radian), angular resolution per pixel in the lateral direction.

In this respect, points in the Z-X plane obtained from the top end points TP1 to TP13 in the x-y plane by the coordinate conversion are respectively defined as converted points RT1 to RT13 of the top end points, and points in the Z-X plane obtained from the bottom end points BP1 to BP13 by the coordinate conversion are defined as converted points RB1 to RB13 of the bottom end points.

Figure 7:
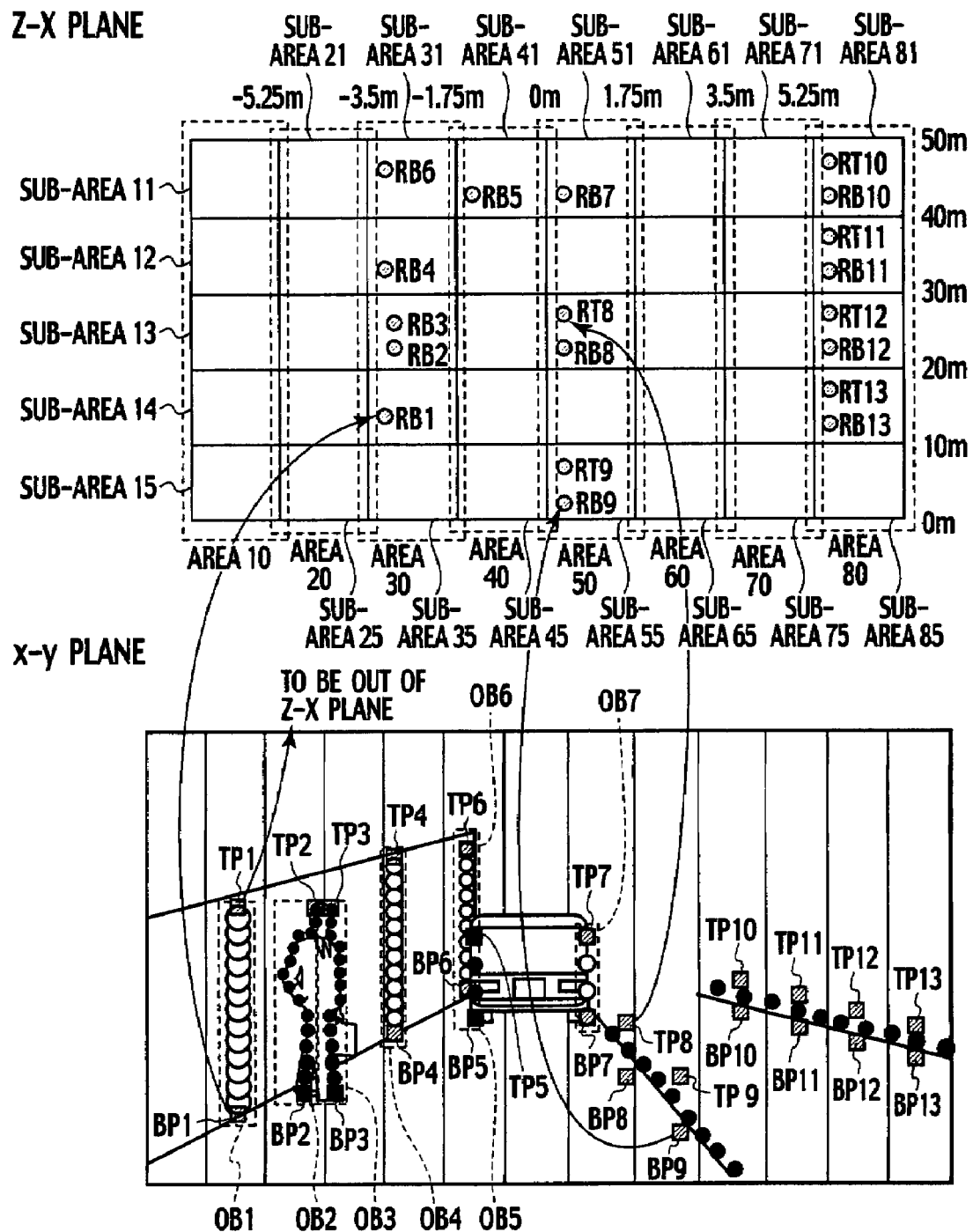
FIG. 7 is a diagram showing an example in which the top end point and the bottom end point detected on the velocity image are expressed in the Z-X plane coordinate system obtained by coordinate conversion, and thereby it is determined whether an object in question is a two-dimensional object or a three-dimensional object.

The object attribute determinator 107 determines which one of sub-areas on the Z-X plane, which are set up by dividing the Z-X plane, the converted points RT1 to RT13 of the top end points and the converted points RB1 to RB13 of the bottom end points are situated in (refer to FIG. 7). In this respect, it is likely that an image picked up by the camera 101 moves upward and downward in response to bumping motion of the vehicle. This makes it likely that converted points may change their positions on the Z-X plane. For the purpose of making the apparatus and the method less susceptible to this influence, it is desirable to set up the sub-areas obtained by dividing the Z-X plane be in the order of meters.

In the case of the present embodiment, the Z-X plane is divided into the following eight sections (Areas) in the X-axis direction; −5.25 m≦X, −5.25 m≦X<−3.5 m, −3.5 m≦X<−1.75 m, −1.75 m≦X<0 m, 0 m≦X<1.75 m, 1.75 m≦X<3.5 m, 3.5 m≦X<5.25 m, 5.25 m≦X. Each of the eight sections of the Z-X plane is further divided into the following five sections (sub-areas) in the Z-axis direction; 0 m≦Z<10 m, 10 m≦Z<20 m, 20 m≦Z<30 m, 30 m≦Z<40 m, 40 m≦Z<50 m. As a result, Area 10, Area 20, Area 30, Area 40, Area 50, Area 60, Area 70, and Area 80 are set up in the Z-X plane. In addition, Area 10 is divided into Sub-areas 11 to 15, Area 20 is divided into Sub-areas 21 to 25, Area 30 is divided into Sub-areas 31 to 35, Area 40 is divided into Sub-areas 41 to 45, Area 50 is divided into Sub-areas 51 to 55, Area 60 is divided into Sub-areas 61 to 65, Area 70 is divided into Sub-areas 71 to 75, Area 80 is divided into Sub-areas 81 to 85.

Furthermore, if a converted point of a top end point in a section in the x-y plane and a converted point of a bottom end point belonging to the same group as the top end point does are situated in a single sub-area in the Z-X plane, it is determined that the top end point and the bottom end point are located on the road surface or substantially close to the road surface. In other words, it is determined that the top endpoint and the bottom end point represent a two-dimensional object on the road surface (the two-dimensional object includes a low height object such as a curb, a white line, etc.).

On the other hand, in a case where a converted point of a top end point and a converted point of a bottom end point which belong to the same group as the top end point does are not situated in a single sub-area in the Z-X plane, or in a case where only the bottom end point is situated in a sub-area in the Z-X plane, it is determined that only the bottom end point is on the road surface or substantially close to the road surface. In other word, it is determined that the bottom end point represents a three-dimensional object standing on the road surface (the three-dimensional object includes a tall object such as a pedestrian, a sign, an exterior wall, a vehicle running ahead, etc.).

In order for detecting a lane boundary line, counters are set up for the respective sub-areas in the Z-X planes, and +1 is added to a counter value registered in the counter set up for the sub-area in which the converted point of the bottom end point is situated. Thereby, information on positional distribution of the bottom end points is calculated.

In the case of the present embodiment, for example, converted points RT1 to RT7 of the respective top end points TP1 to TP7 are projected out of the Z-X plane of FIG. 7. For this reason, it is determined that a group including the top end points TP1 to TP7 is a three-dimensional object, and that edges including the top end points TP1 to TP7 are three-dimensional objects OB1 to OB7 in the x-y plane. In addition, converted points RT8 to RT13 of the top end points TP8 to TP13 are situated in the same sub-areas as the respective converted points RB8 to RB13 of the bottom end points BP8 to BP13 are situated in. In other words, it is determined that the converted point RT8 of the top end point and the converted point RB8 of the corresponding bottom end point are situated in sub-area 53; the converted point RT9 of the top end point and the converted point RB9 of the corresponding bottom end point are situated in sub-area 55; the converted point RT10 of the top end point and the converted point RB10 of the corresponding bottom end point are situated in sub-area 81; the converted point RT11 of the top end point and the converted point RB11 of the corresponding bottom end point are situated in sub-area 82; the converted point RT12 of the top end point and the converted point RB12 of the corresponding bottom end point are situated in sub-area 83; the converted point RT13 of the top end point and the converted point RB13 of the corresponding bottom end point are situated in sub-area 84. As a result, it is determined that groups including the respective top end points TP8 to TP13 represent objects situated on the road surface or being substantially close to the road surface. In this point, for the purpose of detecting the lane boundary line, +1 is added to the counter values respectively registered in the counters of the sub-areas in which the converted points RB1 to RB13 of the bottom end points are situated.

Figure 8:
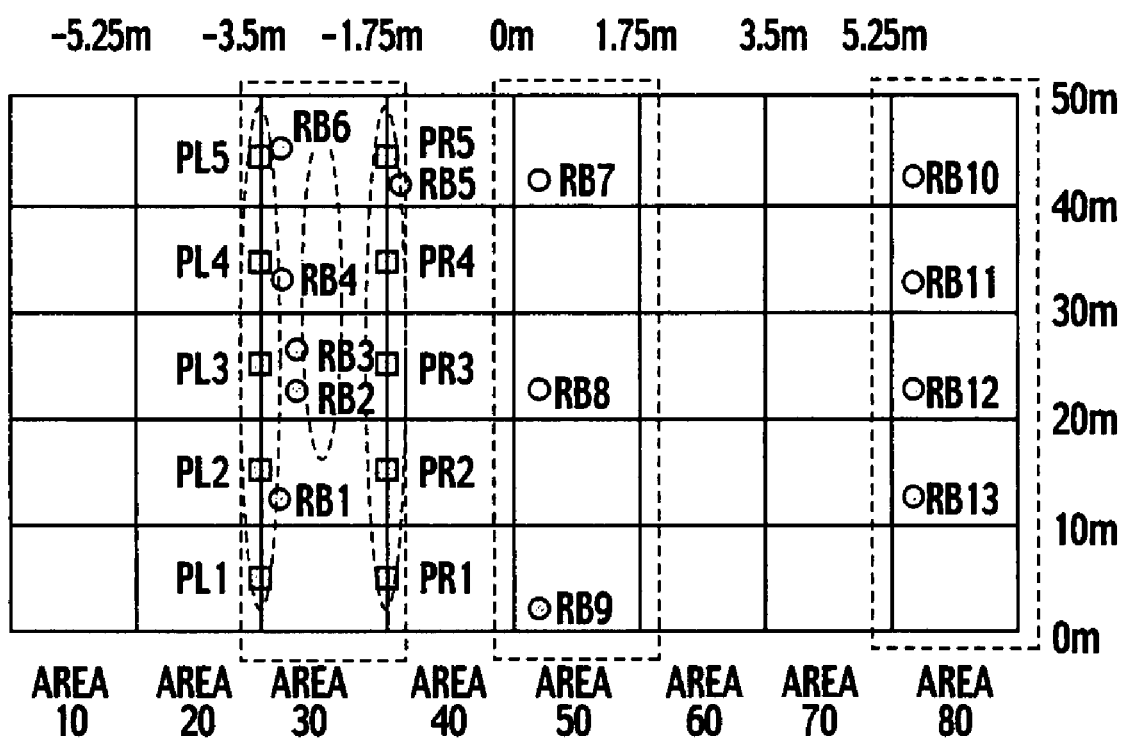
FIG. 8 is a diagram showing an example in which lane boundary lines are detected from positional distribution of the bottom end point expressed in the Z-X plane coordinate system obtained by the coordinate conversion.

Subsequently, as shown in FIG. 8, Areas in which lane boundary lines are highly likely to exist are extracted from the obtained positional distribution of each of the converted points of the bottom end points. In other words, if positive counter values are observed at multiple sub-areas in the Z-axis direction in a single Area in the X-axis direction in the obtained positional distribution of each of the converted points of the bottom end points, it can be assumed that straight lane boundary lines exist in front of the host vehicle and extended in parallel with the running direction of the host vehicle. As a result, the Areas having positive counter values are extracted as Areas in which the lane boundary lines exist. For example, in a case shown in FIG. 8, positive counter values exist in multiple sub-areas in the Z-axis direction (in which the bottom end points RB1, RB2, RB3, RB4 and RB6 are situated) in Area 30 in the X-axis direction. Therefore, the Area 30 is extracted as an Area in which the lane boundary line exists. This is the case with Areas 50 and 80 as well.

Subsequently, it is determined whether or not a straight line representing a part of the lane boundary line exists within each of the extracted Areas 30, 50, and 80 (refer to FIG. 9). In other words, a regression analysis is applied to data of the bottom end points in the x-y plane, which correspond to the converted points of bottom end points located in the respective extracted Areas 30, 50, and 80. Thus, the gradient of a straight line joining bottom end points moving in the same direction in the x-y plane is calculated. For example, for the Area 30 in the present embodiment, a regression analysis is applied to the values of abscissa and ordinate of the bottom end points BP1, BP4 and BP6 in the x-y coordinate system, which respectively correspond to the converted points RB1, RB4 and RB6 of the bottom end points located in Area 30, and which move in the left direction in the x-y plane. Thereby, a gradient a3 of the straight line joining the bottom end points BP1, BP4 and BP6 is calculated. Similarly, a regression analysis is applied to the values of abscissa and ordinate of the bottom end points BP8 and BP9 in the x-y coordinate system, which respectively correspond to the converted points RB8 and RB9 of the bottom end points located in Area 50. Thereby, the gradient a5 of the straight line joining the bottom end points BP8 and BP9 is calculated. Similarly, a regression analysis is applied to the values of abscissa and ordinate of the bottom end points BP10, BP11, BP12 and BP13 in the x-y coordinate system, which respectively correspond to the converted points RB10, RB11, RB12 and RB13 of the bottom end points located in Area 80. Thereby, the gradient a8 of the straight line joining the bottom end points BP10, BP11, BP12 and BP13 is calculated.

Thereafter, it is determined that straight lines representing parts of the lane boundary lines exist in the extracted areas if the calculated gradients of the straight lines fall within a predetermined range. In other words, in a case where the gradient an of a straight line calculated on the basis of bottom end points is within a range of a gradient defined by a gradient Tn0a1 and a gradient Tn0a2, it is determined that a straight line Ln representing a lane boundary line exists in an extracted area. In this respect, the gradient Tn0a1 is that of a straight line calculated by expressing points (for example, PL1 to PL5 shown in FIG. 8), each having a value of abscissa representing a leftmost end of a sub-area in a single Area where a converted point of a bottom end point is situated and a value of ordinate representing a representative coordinate (central coordinate) of the same sub-area, in the x-y coordinate system obtained by coordinate conversion, and by there after applying a regression analysis to the points. The gradient Tn0a2 is that of a straight line calculated by expressing points (for example, PR1 to PR5 shown in FIG. 8), each having a value of abscissa representing a rightmost end of a sub-area in the single Area where a converted point of a bottom end point is situated and a value of ordinate representing a representative coordinate (central coordinate) of the same sub-area, in the x-y coordinate system obtained by coordinate conversion, and by thereafter applying a regression analysis to the points.

For example, in Area 30 of the present embodiment, a point PL1 represents coordinates (x, z)=(−3.5, 5); a point PL2 represents coordinates (x, z)=(−3.5, 15); a point PL3 represents coordinates (x, z)=(−3.5, 25); a point PL4 represents coordinates (x, z)=(−3.5, 35); and a point PL5 represents coordinates (x, z)=(−3.5, 45). The points PL1 to PL5 are expressed in the x-y plane coordinate system obtained by coordinate conversion, and then a regression analysis is applied to the resultant points corresponding to PL1 to PL5. Thereby, a gradient T30a1 of the straight line joining the points corresponding to PL1 to PL5 is calculated. On the other hand, a point PR1 represents coordinates (x, z)=(−1.75, 5); a point PR2 represents coordinates (x, z)=(−1.75, 15); a point PR3 represents coordinates (x, z)=(−1.75, 25); a point PR4 represents coordinates (x, z)=(−1.75, 35); and a point PR5 represents coordinates (x, z)=(−1.75, 45). The points PR1 to PR5 are expressed in the x-y plane coordinate system obtained by coordinate conversion, and thus a regression analysis is applied to the resultant points corresponding to PR1 to PR5. Thereby, a gradient T30a2 of the straight line joining the points corresponding to PR1 to PR5 is calculated. As a result, the gradient a3 of the straight line joining the bottom end points BP1, BP4 and BP6 in the x-y plane which respectively correspond to the points RB1, RB4 and RB6 obtained by projecting the bottom end points BP1, BP4 and BP6, is within the range defined by the gradients T30a1 and T30a2. For this reason, it is determined that the straight line joining the bottom end points BP1, BP4 and BP6 is a line L3 representing a lane boundary line (refer to FIGS. 8 and 9).

With regard to Area 50, it is similarly determined that the straight line joining the bottom end points BP8 and BP9 in the x-y plane which respectively correspond to the points RB8 and RB9 obtained by projecting the bottom end points BP8 and BP9, is a line L5 representing another lane boundary line. With regard to Area 80, it is similarly determined that the straight line joining the bottom end points BP10 to BP13 in the x-y plane which respectively correspond to the points RB10 to RB13 obtained by projecting the bottom end points BP10 to BP13, is a line L8 representing yet another lane boundary line.

Figure 9:
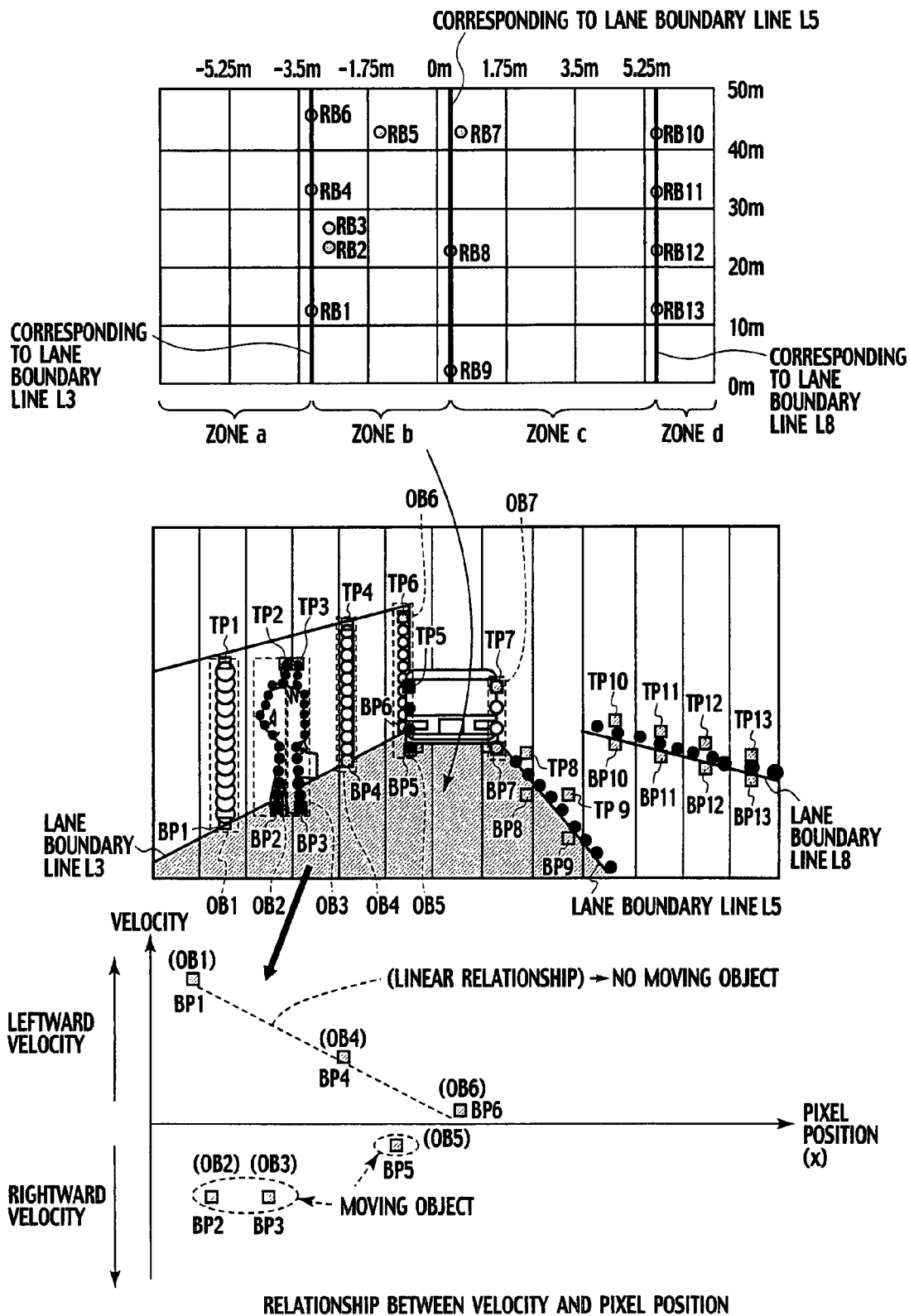
FIG. 9 is a diagram showing a specific example of a case where a moving object is detected from a relationship between horizontal position and velocity of the three-dimensional object detected in a zone of the image defined by the lane boundary lines.

Thereafter, Areas on the Z-X plane are divided into a plurality of zones each defined by lines corresponding to the lane boundary lines, as shown in FIG. 9. A graph is calculated to show a relationship between a horizontal position of a bottom end point of a detected three-dimensional object and a velocity thereof in the image. In this graph, a three-dimensional object situated in the left half of the image, for example a background such as the exterior wall, moves to the left in the image. In addition, the closer to the left end of the image an object is situated, the faster the pixels representing the object move. That is because the object closer to the left end of the image is situated in a position closer to the host vehicle. In other words, when the vertical axis denotes velocities (a velocity at which an object moves to the left is defined as a positive velocity, and a velocity at which an object moves to the right is defined as a negative velocity), and concurrently when the horizontal axis denotes x-coordinates of an image (the leftmost end of the image is defined as an origin of ordinates), any background or any still object in the left half of the image makes relationships between its velocity and x-coordinate to be represented as a downward-sloping straight line. On the other hand, in a case where a relationship of the downward-sloping straight line is not established, it is likely that anything but a background or a still object, that is, an moving object may exist in the left half of the image. In this case, if an object having a velocity (rightward velocity) in a direction opposite to that of the velocity at which a background moves (leftward velocities) is detected as shown in FIG. 9, it is determined that there is a moving object moving in the direction opposite to the direction in which the background moves. Moreover, if an object having a velocity faster than that of a background is detected, it is determined that there is a moving object.

In the case of the present embodiment, for example, on the basis of the lane boundary lines detected in Areas 30, 50 and 80, Zone to the left of Lane Boundary Line L3, or Areas 10 and 20 as well as the left portion of Area 30 are defined as Zone a. Zone interposed between Lane Boundary lines L3 and L5, or the right portion of Area 30, Area 40 and the left portion of Area 50, are defined as Zone b. Zone interposed between Lane Boundary lines L5 and L8, or the right portion of Area 50, Areas 60 and 70 and the left portion of Area 80, are defined as Zone c. Zone to the right of Lane Boundary Line L8, or the right portion of Area 80, is defined as Zone d. Subsequently, on the basis of a relationship between the horizontal position and the velocity of each of three-dimensional objects OB1 to OB6 existing in Zone b, it is determined that three-dimensional objects OB1, OB4 and OB6 are still objects (parts of the exterior wall in this case), and that three-dimensional objects OB2, OB3 and OB5 moving to the right are moving objects.

A relationship between a velocity (a velocity at which an object moves to the right is defined as a positive velocity, and a velocity at which an object moves to the left is defined as a negative velocity) and its corresponding x-coordinate of each of three-dimensional objects existing in the right half of the image is found as in the case of the three-dimensional objects in the left half of the image. In a case where there is no positive (upward-sloping) linear relationship, it is determined that a three-dimensional object is highly likely to exist in the right half of the image. In a case where a object having a velocity in a direction opposite to that of a velocity at which a background moves is detected, a moving object moving in a direction opposite to the direction in which the background moves is detected. In the case of FIG. 9, it is to be determined that the three-dimensional object OB7 in Zone c represents a moving object.

The information on behavior of the host vehicle (for example, the direction in which the host vehicle runs/turns, or the speed at which the host vehicle runs/turns) can be used to determine whether the detection of a moving object needs to be carried out independently on each of the right half and the left half of the picked up image as in the foregoing manner, or can be done on the entire image picked up. In a case where, for example, the vehicle is being steered to the right, no other velocity but a velocity to the left is detected on a background or a still object in the forward image. For this reason, the detection of a moving object can be carried out on the entire picked up image as a whole, and the detection of a moving object independently on each of the right half and the left half of the picked up image as previously described is not needed. This is similar to the case with the vehicle being steered to the left as well.

Whether or not a three-dimensional object is a moving object is determined by comparing a three-dimensional object as a background with a possible moving object in their horizontal positions and velocities. As a result, in a case where, for example, no other object but a three-dimensional object corresponding to a pedestrian can be detected while no three-dimensional object corresponding to a background such as an exterior wall can be extracted, it can not be determined that the three dimensional object corresponding to a pedestrian is a moving object. In this case, when it is once again determined through the following detection that there is a three-dimensional object corresponding to a pedestrian, whether or not the three-dimensional object is a moving object is determined on the basis of change in its velocity (details will be described later).

It should be noted that, in a case where the difference in the x-coordinate among multiple moving objects is within a predetermined range, and concurrently in a case where the ratio of velocities of these moving objects to one another is within a predetermined range, the multiple moving objects are grouped into a group representing a single moving object. In FIG. 9, for example, the three-dimensional objects OB2 and OB3 are grouped into a group representing a single moving object.

Figure 10:
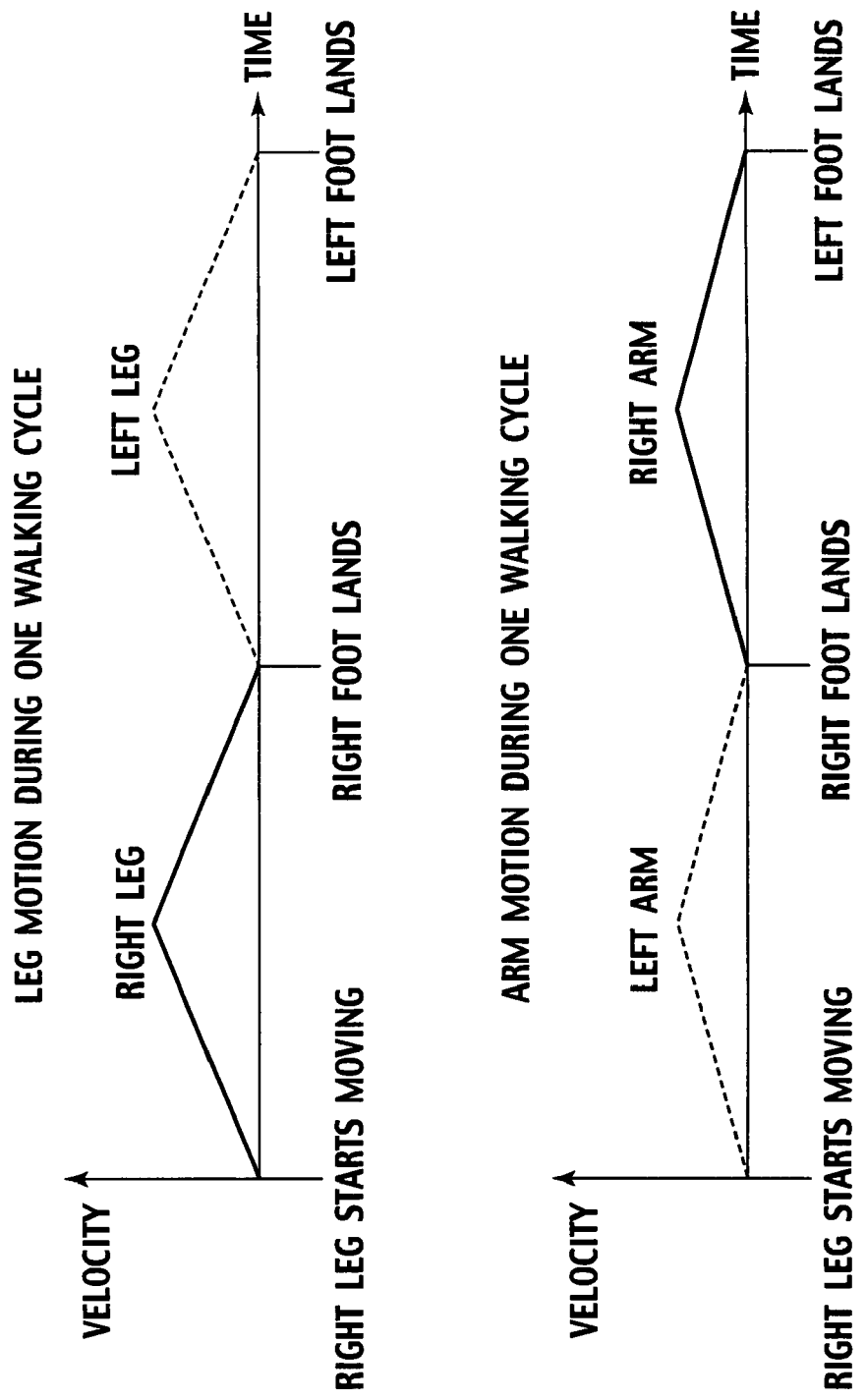
FIG. 10 is a graph showing change in motion velocity of each of the legs and the arms of a pedestrian.

The pedestrian determinator 108 determinates whether or not the moving object is a pedestrian, by using the detected change in the velocity of the moving object in a zone defined by lane boundary lines as an index, as shown in FIG. 10.

Figure 11:
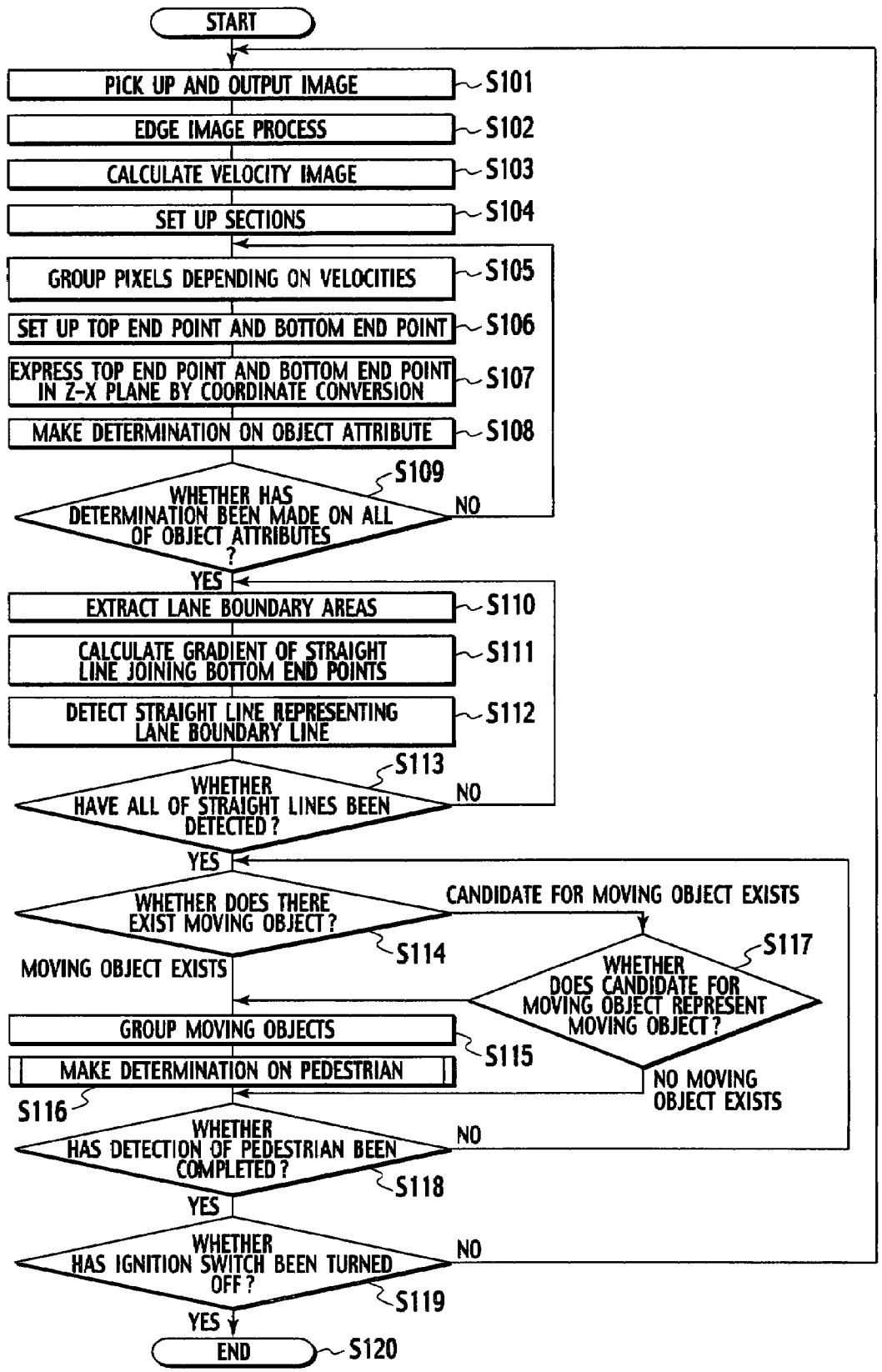
FIG. 11 is a flowchart according to the embodiment of the present invention.

Examining the velocity of a pedestrian walking at a constant velocity in detail, it is observed that walking motion increases and decreases the velocity of each of the arms and the legs, as shown in FIGS. 10 and 11. Let us observe change in the velocity of each of the legs after the pedestrian starts to walk. The pedestrian starts to walk, first of all, by stepping the right leg forward in the walking direction, for example. Subsequently, the velocity of the right leg gradually increases from zero up to the top velocity. Thereafter, the velocity of the right leg gradually decreases, and becomes zero when the right foot is placed down on the ground. Once the right food is placed down on the ground, the left leg is simultaneously is stepped forward in the walking direction in turn. Thereafter, change in the velocity of the left leg is observed as in the case of the change in the velocity of the right leg.

Let us observe change in the velocity of each of the arms after a pedestrian starts to walk. Change in the velocity of the arms is observed which is in a direction opposite to the change in the velocity of the legs.

As described above, the pedestrian is characterized in that his/her change in the velocity is observed through his/her walking motion.

With this characteristic into consideration, it can be determined whether or not a moving object is a pedestrian by use of this characteristic.

More specifically, when $\Delta V$ denotes the variance of the velocity of a moving object, it can be determined whether or not a moving object is a pedestrian depending on whether or not $\Delta V$ is larger than a predetermined value $\Delta VP$, or whether or not a condition of $\Delta V \leq \Delta VP$ is satisfied.

FIG. 11 is a flowchart showing a process which is carried out by the pedestrian detector 10 according to the present embodiment. This process is carried out as a program which is activated when an ignition switch (not illustrated) is turned on.

In step S101, an image of the scene in front of the host vehicle which is picked up by the camera 101, and which is recorded in the temporary image recorder 102, is outputted to the characteristic point extractor 103 at a predetermined cycle. Thereafter, the flow proceeds to step S102.

In step S102, the characteristic point extractor 103 applies an edge extracting process to the image, and thus extracts outlines of each of objects existing in the picked up image to generate an edge image. In addition, the characteristic point extractor 103 normalizes the edge image. Subsequently, the flow proceeds to step S103.

In step S103, the movement information calculator 104 calculates the velocity and direction of each of the edges, and thus calculates a velocity image in which each of the calculated velocities is expressed with a predetermined class. After that, the flow proceeds to step S104.

In step S104, the grouping unit 105 sets up sections on the velocity image thus calculated. Afterward, the flow proceeds to step S105.

In step S105, the grouping unit 105 checks on whether there is a pixel having a velocity in each of the sections by scanning the section from the bottom to the top. In a case where there are multiple pixels each having a velocity, and concurrently in a case where the difference in velocity among the multiple pixels is smaller than a predetermined value $\Delta VG$, the grouping unit 105 groups the multiple pixels into a single group on the assumption that the multiple pixels represent a single object. Subsequently, the flow proceeds to step S106.

In step S106, center coordinates of a pixel situated in the uppermost position is set up as a top end point, and center coordinates of a pixel situated in the lowermost position is set up as a bottom end point, in each of the groups in each of the sections. After that, the flow proceeds to step S107.

In step S107, the coordinate converter 106 expresses values of abscissa and ordinate of each of the detected top end points and the bottom end points in the Z-X plane coordinate system obtained by coordinate conversion using Formulas 1 and 2 previously described. Thereafter, the flow proceeds to step S108.

In step S108, the object attribute determinator 107 determines which sub-area of the Z-X plane having defined ranges in the X-axis direction and in the Z-axis direction the converted points of the top end points and the converted points of the bottom end points belonging to the same group as the top end point does are situated in. In a case where a converted point of a top end point and a converted point of a bottom end point belonging to the same group as the top end point does are situated in a single sub-area on the Z-X plane, it is determined that an object including the top end point and the bottom end point represents a two-dimensional object. On the other hand, in a case where a converted point of a top end point and a converted point of a bottom end point which belongs to the same group as the top end point does are not situated in a single sub-area on the Z-X plane, or in a case where only the bottom end point belonging to the same group as the top end point does is situated in the Z-X plane, it is determined that an object including the top end point and the bottom end point represents a three-dimensional object. In this respect, +1 is added to a counter value registered in a counter set up for the sub-area in which the converted point of the bottom end point is situated. Subsequently, the flow proceeds to step S109.

In step S109, the object attribute determinator 107 checks on whether or not a determination (hereinafter refer to as an "object attribute determination") has been made for all of the detected top end points and the detected bottom end points concerning whether an object including any one of the top end points and a corresponding one of the bottom end points represents a two-dimensional object or a three-dimensional object. In a case where an object attribute determination has been made for all of the detected top end points and the detected bottom end points, the flow proceeds to step S110. On the other hand, in a case where an object attribute determination has not been made for all of the detected top end points and the detected bottom end points yet, the flow returns to step S105, where an object attribute determination is repeatedly made.

In step S110, on the basis of positional distribution of each of the converted points of the bottom end points in the Z-X plane, the object attribute determinator 107 extracts an Area in the X-axis direction, including a plurality of sub-areas in a plurality of ranges in the Z-axis direction, having positive counter values. The extracted Areas are those in which lane boundary lines are highly likely to exist (hereinafter referred to as "lane boundary areas"). Thereafter, the flow proceeds to step S111.

In step S111, the object attribute determinator 107 applies a regression analysis to the bottom end points in the x-y plane corresponding to the converted points of the bottom end points located in the extracted lane boundary areas. Thus, the object attribute determinator 107 calculates the gradient of a straight line joining the bottom end points moving in the same direction on the x-y plane. Afterward, the flow proceeds to step S112.

In step S112, the object attribute determinator 107 determines that straight lines representing parts of lane boundary lines exist in the extracted areas, if the gradients of the straight lines which have been calculated in step S111 fall within a range of a gradient defined by the following two gradients in the x-y coordinate system. Then, the straight lines which have been calculated in step S111 are detected as those representing the lane boundary lines. In this respect, one of the two gradients is that of a straight line joining points (for example, PL1 to PL5 shown in FIG. 8), each having a value of abscissa representing a leftmost end of a sub-area in an Area in the X-axis direction where a converted point of a bottom end point is situated and a value of ordinate representing a representative coordinate of the sub-area in the Z-axis direction. The other of the two gradients is that of a straight line joining points (for example, PR1 to PR5 shown in FIG. 8), each having a value of abscissa representing a rightmost end of the sub-area and a value of ordinate representing a representative coordinate of the same sub-area in the Z-axis direction. After step S112, the flow proceeds to step S113.

In step S113, the object attribute determinator 107 determines whether or not all of the straight lines representing the lane boundary lines have been detected in the extracted lane boundary areas. In a case where all of the straight lines representing the lane boundary lines have been detected, the flow proceeds to step S114. On the other hand, in a case where all of the straight lines representing the lane boundary lines have not been detected yet, the flow returns to step S110, where a straight line representing a lane boundary line is repeatedly detected.

In step S114, the object attribute determinator 107 calculates a relationship between a velocity and an x-coordinate of a three-dimensional object (such as an exterior wall and a pedestrian) existing in each of the zones defined by corresponding one of the lane boundary lines. In a case where there exists a three-dimensional object detected as being moving at a velocity in a direction opposite to a direction in which a background moves, it is determined that there exists a moving object coming closer to the host vehicle. Subsequently, the flow proceeds to step S115. On the other hand, in a case where there exist no object detected as being moving at a velocity in a direction opposite to a direction in which a background move, it is determined that a candidate for a moving object is likely to exist. Thereafter, the flow proceeds to step S117.

In step S115, in a case where the difference in x-coordinate among multiple moving objects is within a predetermined range, and concurrently in a case where the ratio of velocities of these moving objects to one another is within a predetermined range, the multiple moving objects are grouped into a group representing a single moving object. For example, a moving object A and a moving object B are grouped into a group representing a single moving object in a case where $1 \leq (VA/VB) \leq RV$ (a predetermined value) is satisfied when $VA \geq VB$, where VA denotes a velocity of the moving object A and VB denotes a velocity of the moving object B. Thereafter, the flow proceeds to step S116.

In step S116, it is determined that a moving object is a pedestrian on the basis of change in the velocity at which the pedestrian moves. Detailed descriptions will be provided later for this determination. After step S116, the flow proceeds to step S118.

In step S117, the object attribute determinator 107 determines whether or not the candidate for a moving object represents a moving object (verifies whether or not the candidate for a moving object represent a moving object). In a case where the candidate for a moving object has previously existed in a zone where it is currently determined that the candidate for a moving object exists, the object attribute determinator 107 compares the previous velocity with the current velocity. In a case where the candidate for a moving object represents a still object, the candidate for a moving object comes closer to the host vehicle as the host vehicle runs forward. Accordingly, pixels corresponding to the candidate for a moving object moves at a higher velocity. For this reason, in a case where a converted point of a bottom end point moves at a velocity higher than previously detected, it is determined that there exist no moving object. Subsequently, the flow proceeds to step S118. In a case where the converted point of the bottom end point moves at a velocity not higher than the previously detected velocity, it is determined that there exists a moving object. After that, the flow proceeds to step S115.

In step S118, it is determined whether or not detection of a pedestrian has been completed in all of the zones defined by the lane boundary lines. In a case where the detection of a pedestrian has been completed in all of the zones, the flow proceeds to step S119. On the other hand, in a case where the detection of a pedestrian has not been completed in all of the zones yet, the flow returns to step S114, where the detection of a pedestrian continues.

In step S119, it is determined whether or not the ignition switch of the host vehicle has been turned off. In a case where the ignition switch has not been turned off yet, the flow returns to step S101, where the process is repeatedly carried out. On the other hand, in a case where the ignition switch has been turned off, the flow proceeds to step S120, where the process is terminated.

Figure 12:
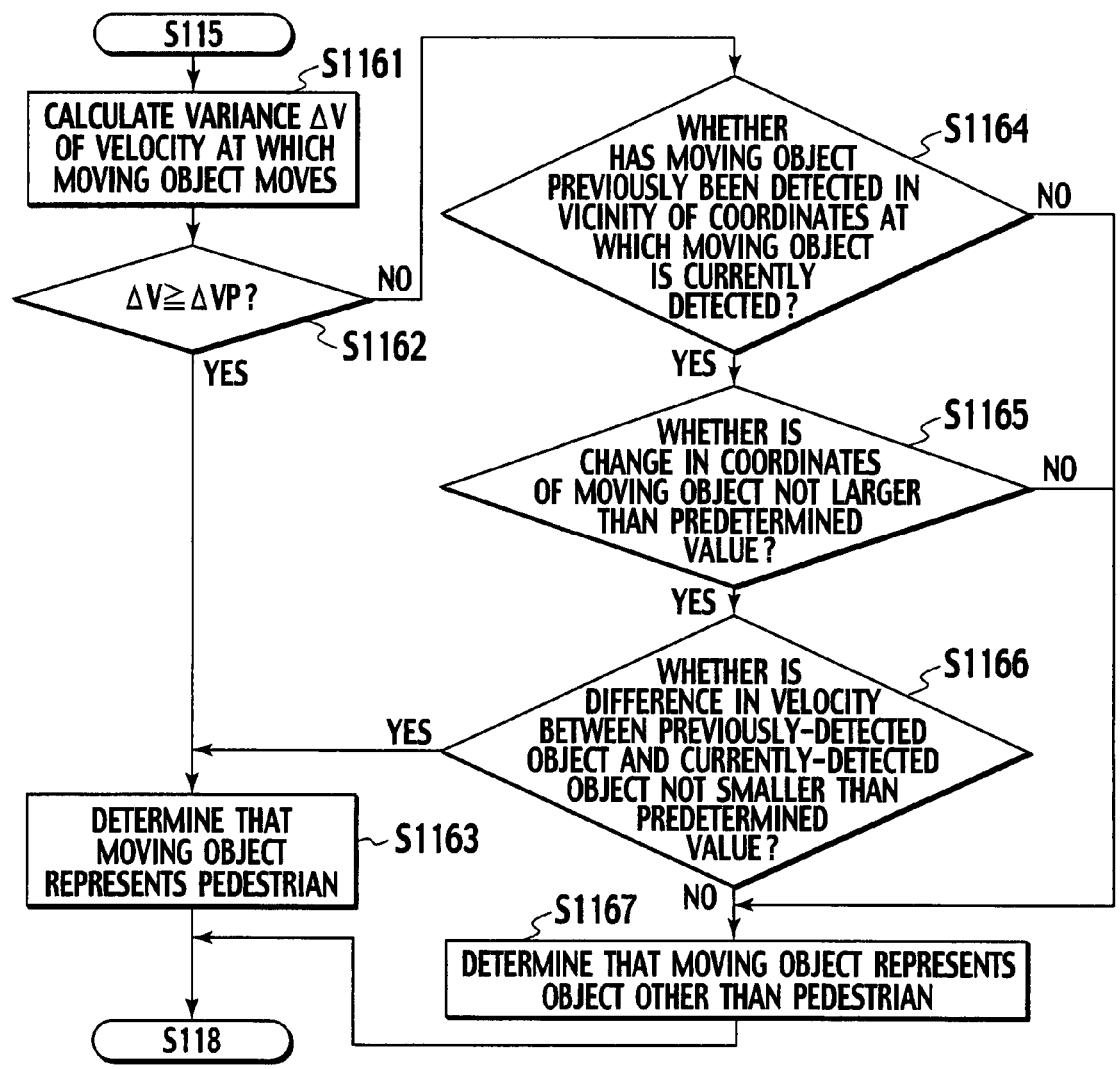
FIG. 12 is another flowchart according to the embodiment of the present invention, which shows how it is determined that a moving object is a pedestrian.

By use of a flowchart shown in FIG. 12, descriptions will be provided next for a flow of an operation in step S116 for determining whether or not a moving object is a pedestrian. This operational flow is carried out by the pedestrian determinator 108.

In step S1161, the variance $\Delta V$ of the velocity of a moving object is calculated from the velocity of pixels representing a moving object. Afterward, the flow proceeds to step S1162.

In step S1162, it is determined whether or not the variance $\Delta V$ of the velocity of the moving object which has been calculated in step S1161 satisfies a condition of $\Delta V \geq \Delta VP$, where $\Delta VP$ is a predetermined value set up in advance. In a case where the variance $\Delta V$ satisfies the condition, it is observed that the variance $\Delta V$ of the velocity of the moving object is larger than the predetermined value. Thus, it is determined that the moving object is a pedestrian. Subsequently, the flow proceeds to step S1163. On the other hand, in a case where the variance ΔV does not satisfy the condition, it is not observed that the variance ΔV of the velocity of the moving object is larger than the predetermined value. Thus, on the basis of the variance ΔV of the velocity of the moving object only, it can not be determined that the moving object is a pedestrian. For this reason, the flow proceeds to step S1164.

In step S1163, it is determined that the moving object is a pedestrian. Thereafter, the flow proceeds to step S118.

In step S1164, it is determined whether or not the moving object detected this time has been previously detected in a vicinity of the coordinates at which the moving object is detected this time as well. In a case where the moving object detected this time has been previously detected in the vicinity of the coordinates at which the moving object is detected this time as well, the flow proceeds to step S1165. On the other hand, in a case where the moving object detected this time has not been previously detected in the vicinity of the coordinates at which the moving object is detected this time, it is assumed that the moving object moves at a high velocity. Then, the flow proceeds to step S1167.

In step S1165, it is determined whether change in coordinates of the moving object between the previous detection and the current detection is not larger than a predetermined value in both the vertical direction and the horizontal direction. In a case where the change in coordinates of the moving object between the previous detection and the current detection is not larger than the predetermined value, or in a case where a distance over which the moving object has moved is not larger than a predetermined value, it is likely that the moving object may be an object moving at a low speed or a pedestrian. Then, the flow proceeds to step S1166. On the other hand, in a case where the change in coordinates of the moving object between the previous detection and the current detection exceeds the predetermined value in the vertical direction or the horizontal direction, or in a case where the distance over which the moving object has moved exceeds the predetermined value, it is assumed that the moving object is an object moving at a higher velocity, and that it is accordingly less likely that the moving object may be a pedestrian. Then, the flow proceeds to step S1167.

In step S1166, it is determined whether or not the difference in the velocity of the moving object between the previous detection and the current detection is larger than a predetermined value. In a case where the difference in the velocity of the moving object between the previous detection and the current detection is larger than the predetermined value, this means that the moving object changes in coordinates to a small extent, and changes in velocity to a large extent. This makes it possible to assume that the moving object is a pedestrian. Thus, the flow proceeds to step S1163. On the other hand, in a case where the difference in the velocity of the moving object between the previous detection and the current detection is smaller than the predetermined value, it is assumed that the moving object is an object moving at an even and low velocity, such as a slowly-moving bicycle. Thus, the flow proceeds to step S1167.

In step S1167, it is determined that the moving object is an object other than a pedestrian. Subsequently, the flow proceeds to step S118.

Example 1

Example 1 of the present invention is different from the foregoing embodiment in the way how it is determined whether or not a moving object is a pedestrian in step S116 in the flowchart shown in FIG. 11. The other configuration and operation of the present example is the same as those of the foregoing embodiment. For this reason, descriptions will be provided below only for the way how it is determined whether or not a moving object is a pedestrian in step S116.

While a pedestrian walks, he/she moves the legs forward alternately, and usually swings the arms backward and forward alternately. In some cases, a pedestrian walks without swinging the arms at all. In such a case, it can be determined whether or not a moving object is a pedestrian by focusing only on the variance of the velocity of each of the legs.

Figure 13:
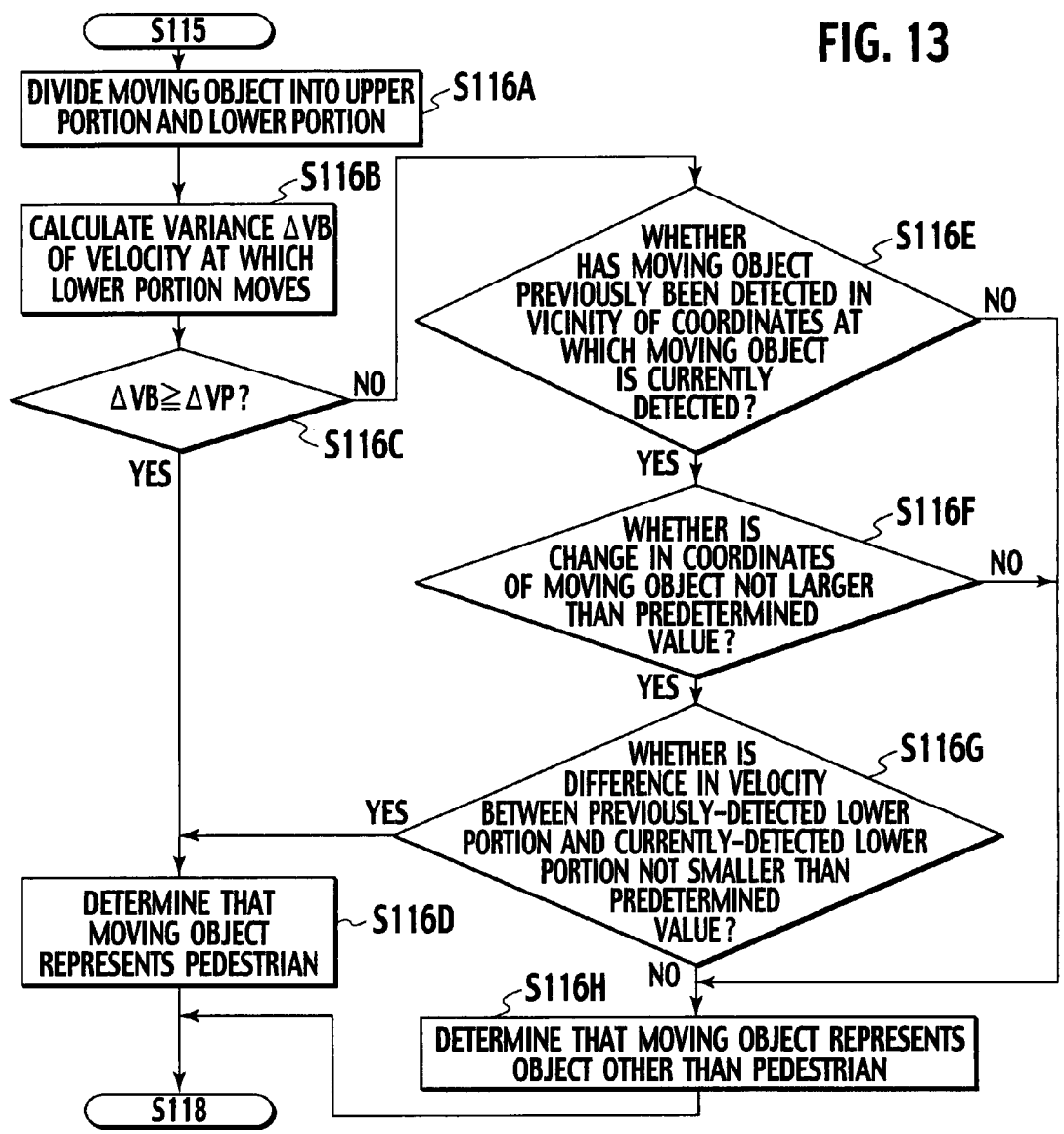
FIG. 13 is a flowchart according to Example 1 of the present invention, which shows how it is determined that a moving object is a pedestrian.
Figure 14:
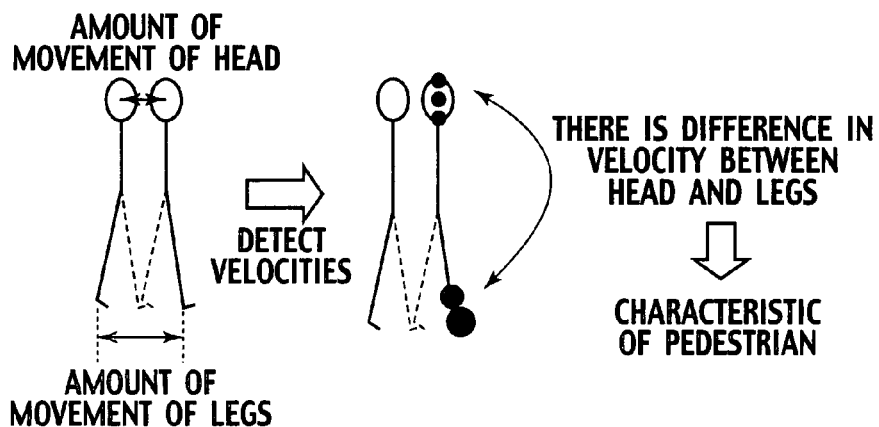
FIG. 14 is a diagram showing a relationship between velocities of the head and the legs of a pedestrian.

Descriptions will be provided for a flow of the operation for determining in step S116 whether or not a moving object is a pedestrian by use of a flowchart shown in FIG. 13. This operational flow is carried out by the pedestrian determinator 108.

In step S116A, the moving object which has been detected in steps S114 and S117 is divided into an upper portion and a lower portion. In this case, the detected moving object is simply divided into an upper half and a lower half. Otherwise, the detected moving object is divided into an upper portion and a lower portion at a certain ratio of the upper portion to the lower portion. After step S116A, the flow proceeds to step S116B.

In step S116B, the pedestrian determinator 108 calculates the variance ΔVB of the velocity at which pixels belonging to the lower portion obtained by dividing the moving object into the two portions in step S116A. Thereafter, the flow proceeds to step S116C.

In step S116C, it is determined whether or not the variance ΔVB of the velocity of the lower portion of the moving object which has been calculated in step S1162 satisfies a condition of ΔVB≧ΔVP, where ΔVP denotes a predetermined value set up in advance. In a case where the variance ΔVB satisfies the condition, it is observed that the variance ΔV of the velocity of the lower portion of the moving object is larger than a predetermined value. Thus, it is determined that the moving object is a pedestrian. Then, the flow proceeds to step S116D. On the other hand, in a case where the variance ΔVB does not satisfy the condition, it is not observed that the variance ΔVB of the velocity of the lower portion of the moving object is larger than the predetermined value. Thus, on the basis of the variance ΔVB of the velocity of the lower portion of the moving object only, it can not be determined that the moving object is a pedestrian. Then, the flow proceeds to step S116E.

Processes to be carried out in steps S116E to S116H are the same as those to be carries out in steps S1164 to S1167 in FIG. 12. For this reason, descriptions will be omitted for the processes to be carried out in steps S116E to S116H.

Example 2

Example 2 of the present invention is different from the foregoing embodiment in the way how it is determined whether or not a moving object is a pedestrian in step S116 in the flowchart shown in FIG. 11. The other configuration and operation of the present example is the same as those of the foregoing embodiment. For this reason, descriptions will be provided below only for the way how it is determined whether or not a moving object is a pedestrian in step S116.

While a pedestrian walks, change in the velocity of the head is small whereas change in the velocity of each of the legs is large. For this reason, it can be determined whether or not a moving object is a pedestrian by using a ratio of a value representing a maximum velocity of the head to a value representing a maximum velocity of the legs as an index.

Figure 15:
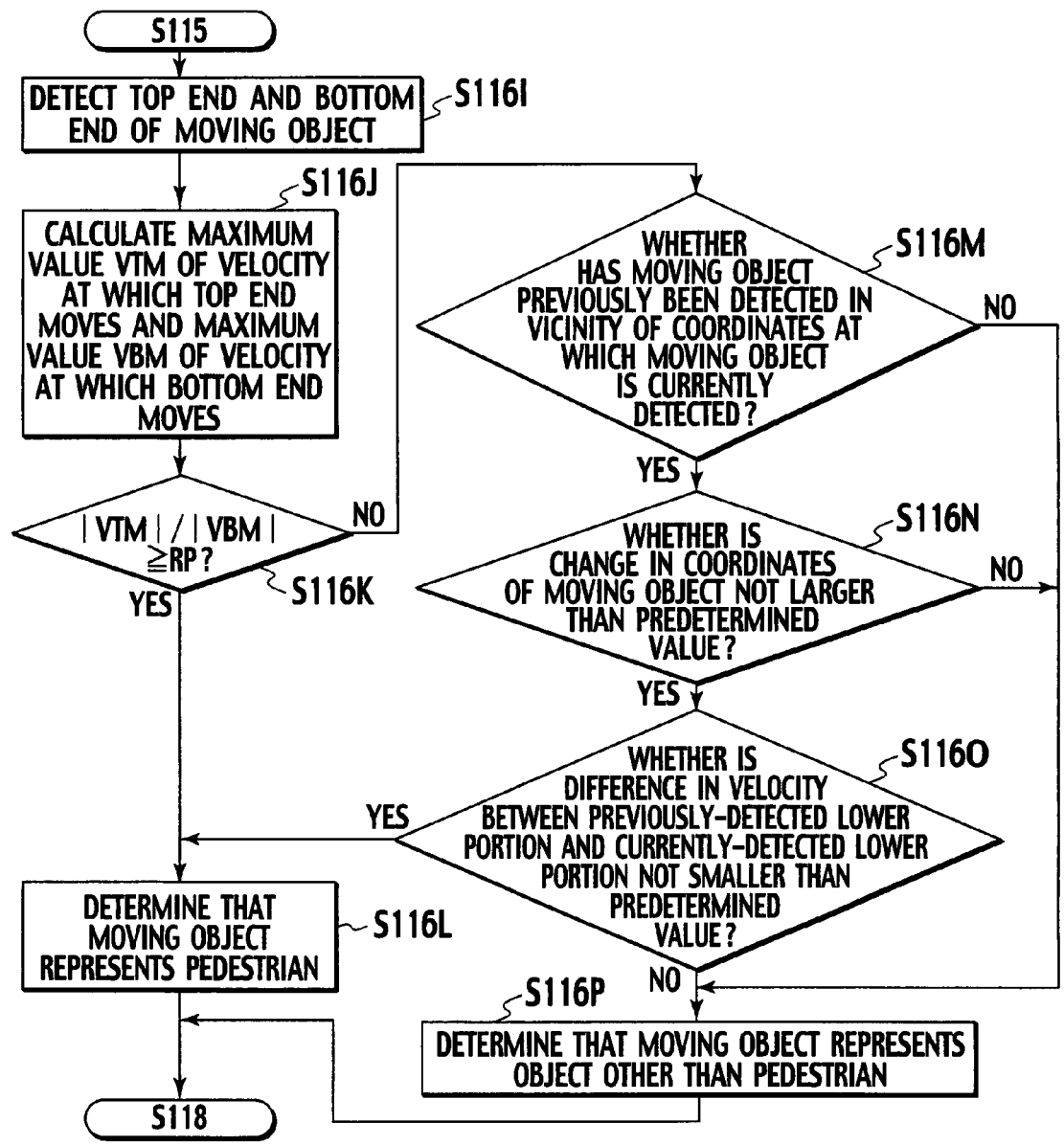
FIG. 15 is a flowchart according to Example 2 of the present invention, which shows how it is determined that a moving object is a pedestrian.

Descriptions will be provided for a flow of the operation for determining in step S116 whether or not a moving object is a pedestrian by use of a flowchart shown in FIG. 15. This operational flow is carried out by the pedestrian determinator 108.

In step S116I, from the moving object which has been detected in steps S114 and S117, the pedestrian determinator 108 detects the top end corresponding to the head and the bottom end corresponding to the feet. Subsequently, the flow proceeds to step S116J.

In step S116J, the pedestrian determinator 108 calculates a value representing a maximum velocity VTM at which pixels belonging to the top end of the moving object detected in step S116I move and a value representing a maximum velocity VBM at which pixels belonging to the bottom end of the same moving object move. Afterward, the flow proceeds to step S116K.

In step S116K, it is determined whether or not the value VTM representing the maximum velocity at which the pixels belonging to the top end of the moving object move and the value VBM representing the maximum velocity at which the pixels belonging to the bottom end of the same moving object move satisfy a condition of $|VBM|/|VTM| \geq RP$. In this respect, the value VTM and the VBM are those which have been calculated in step S116J. RP is a predetermined value set up in advance, and satisfies $1 \leq RP \leq RV$. In a case where the value VTM and the VBM satisfy the condition, the difference in velocity between the top end and the bottom end of the moving object can be observed. Thus, it can be determined that the moving object is a pedestrian. Then, the flow proceeds to step S116L. On the other hand, in a case where the value VTM and the VBM do not satisfy the condition, the difference in velocity between the top end and the bottom end of the moving object can not be observed. Thus, on the basis of the difference in velocity between the top end and the bottom end of the moving object only, it can not be determined that the moving object is a pedestrian. Then, the flow proceeds to step S116M.

Processes to be carried out in steps S116M to S116P are the same as those to be carries out in steps S1164 to S1167 in FIG. 12. For this reason, descriptions will be omitted for the processes to be carried out in steps S116M to S116P.

Example 3

The present example makes it possible to detect a two-dimensional object and a three-dimensional object even in a case where, for example, edge detection precludes pixels representing a single three-dimensional object or a single moving object from being grouped into a single group on the basis of their velocity information.

Figure 16:
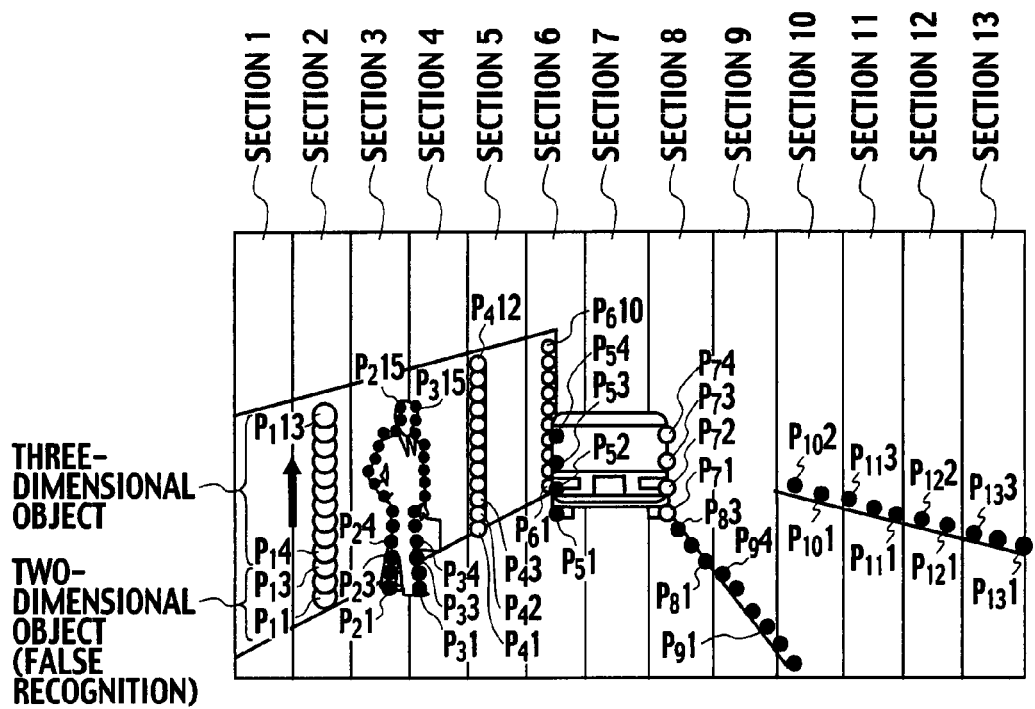
FIG. 16 is a diagram showing an example in which the velocity image is divided into sections, pixels having velocities in each of the sections are expressed in the Z-X plane coordinate system obtained by coordinate conversion, and a determination is made on whether the resultant point is a candidate point for a two-dimensional object or a candidate point for a three-dimensional object.

Descriptions will be provided for the processes to be carried out in steps S116M to S116P by use of an example shown in FIG. 16 in which, out of $P_1 1$ to $P_1 13$ detected on the exterior wall, $P_1 1$ to $P_1 3$ are grouped into one group, and $P_1 4$ to $P_1 13$ are grouped into the other group; out of $P_2 1$ to $P_2 15$, $P_2 1$ to $P_2 3$ are grouped into one group, and $P_2 4$ to $P_2 15$ are grouped into the other group; out of $P_3 1$ to $P_3 15$, $P_3 1$ to $P_3 3$ are grouped into one group, and $P_3 4$ to $P_3 15$ are grouped into the other group; and out of $P_4 1$ to $P_4 12$ detected on the exterior wall, $P_4 1$ to $P_4 2$ are grouped into one group, and $P_4 3$ to $P_4 12$ are grouped into the other group.

It should be noted that, in addition to using FIG. 16, the present example will be described by use of: the block diagram shown in FIG. 1; the diagram shown in FIG. 2 which illustrates the example of how the camera 101 is mounted on the vehicle; the diagram shown in FIG. 3 which illustrates the image of the scene in front of the vehicle, and picked up by the camera 101; the diagram shown in FIG. 4 which illustrates the example of normalizing edges; and the velocity image shown in FIG. 5. However, the descriptions, will be omitted for these diagrams, because these diagrams have been described for the forgoing embodiment. In addition, the present example is carried out by use of the method described by used of FIGS. 8 to 9 for detecting lane boundary lines on the basis of bottom end points, and for thus detecting a moving object for each of the zones defined by the detected lane boundary lines on the basis of a relationship between the position in the horizontal position and the velocity of a three-dimensional object. However, the descriptions will be omitted for the method, because the method has been described for the forgoing embodiment.

First of all, in a velocity image calculated, sections are set up for detecting an object. In other words, as shown in FIG. 16, a plurality of sections are set up on the velocity image, and thus the velocity image is vertically divided into multiple vertically extending sections of equal width (hereinafter referred to as "sections"). In the case of the present example, the image is scanned from the bottom to the top in each of the sections, and thus pixels each with a velocity are sequentially detected. The pixels thus detected are expressed in the Z-X plane coordinate system obtained by coordinate conversion on the basis of Formulas 1 and 2 which have been described above. Subsequently, it is determined whether or not the result of the coordinate conversion is situated in the Z-X plane shown in FIG. 7. In a case where the result is situated in the Z-X plane, it is determined that the result is a point representing a candidate for a two-dimensional object. On the other hand, in a case where the result is not situated in the Z-X plane, it is determined that the result is a point representing a candidate for a three-dimensional object. It should be noted that Areas and sub-areas, which are the same as those described in the case of the foregoing embodiment, are set up in the Z-X plane in the case of the present example. The descriptions will be omitted for how the Areas and sub-areas are set up.

In the present example, for instance, it is determined that $P_1 1$ to $P_1 3$ are situated in a sub-area on the Z-X plane, and that $P_1 1$ to $P_1 3$ are points representing a candidate for a two-dimensional object. Because $P_1 4$ to $P_1 13$ are not situated in the Z-X plane, it is determined that $P_1 4$ to $P_1 13$ are points representing a candidate for a three-dimensional object. Similarly, it is determined that $P_2 1$ to $P_2 3$ are points representing a candidate for a two-dimensional object; $P_3 1$ to $P_3 3$ are points representing a candidate for a two-dimensional object; $P_4 1$ is a point representing a candidate for a two-dimensional object; $P_4 2$ is a point representing a candidate for a two-dimensional object; $P_8 1$ to $P_8 3$ are points representing a candidate for a two-dimensional object; $P_9 1$ to $P_9 4$ are points representing a candidate for a two-dimensional object; $P_{10} 1$ is a point representing a candidate for a two-dimensional object; $P_{10} 2$ is a point representing a candidate for a two-dimensional object; $P_{11} 1$ to $P_{11} 3$ are points representing a candidate for a two-dimensional object; $P_{12} 1$ is a point representing a candidate for a two-dimensional object; $P_{12} 2$ is a point representing a candidate for a two-dimensional object; and $P_{13} 1$ to $P_{13} 3$ are points representing a candidate for a two-dimensional object. It is determined that $P_2 4$ to $P_2 15$ are points representing a candidate for a three-dimensional object; $P_3 4$ to $P_3 15$ are points representing a candidate for a three-dimensional object; $P_4 3$ to $P_4 12$ are points representing a candidate for a three-dimensional object; $P_5 1$ to $P_5 4$ are points representing a candidate for a three-dimensional object; $P_6 1$ to $P_6 10$ are points representing a candidate for a three-dimensional object; and $P_7 1$ to $P_7 4$ are points representing a candidate for a three-dimensional object.

Figure 17:
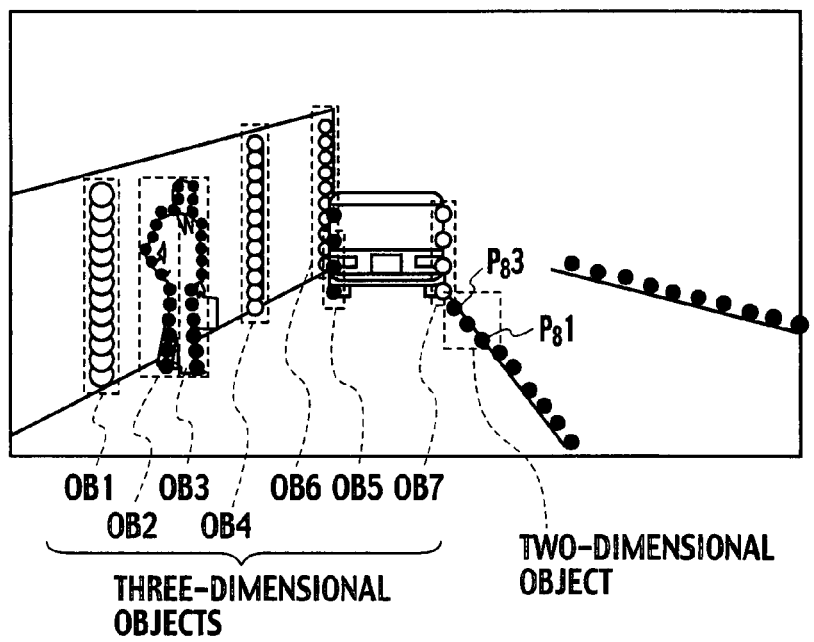
FIG. 17 is a diagram showing an example of how it is determined that a detected object is a three-dimensional object from arrangements of the detected candidate points for a two-dimensional object and the detected candidate points for a three-dimensional object.

Subsequently, on the basis of results each of determining whether each of the points is that representing a candidate for a two-dimensional object or a three-dimensional object, it is determined whether or not each of the points represents a three-dimensional object. Specifically, in a case where a point determined to be a point representing a candidate for a two-dimensional object and a point determined to be a point representing a candidate for a three-dimensional object are located next to each other in the vertical direction, it can be assumed that it is mistakenly determined that a part of the three-dimensional object which exists closer to the road surface is the point representing the candidate for the two-dimensional object. For this reason, it is determined that the object corresponding to the point representing the candidate for the two-dimensional object and the point representing the candidate for the three-dimensional object which are located next to each other in the vertical direction is the three-dimensional object. In the case of the present example, for instance, a group of the points $P_11$ to $P_13$ representing the candidate for the two-dimensional object and a group of the points $P_14$ to $P_113$ representing the candidate for the three-dimensional object exist next to each other in the vertical direction. For this reason, it is determined the $P_11$ to $P_113$ represent a three-dimensional object OB1. Similarly, it is determined that $P_21$ to $P_215$ represent a three-dimensional object OB2; $P_31$ to $P_315$ represent a three-dimensional object OB3; $P_41$ to $P_412$ represent a three-dimensional object OB4 (see FIG. 17).

Thereafter, bottom end points are extracted from the points which are determined that represent their respective two-dimensional points and the points which are determined that represent their respective three-dimensional points. In common with the case of Example 1, +1 is added to a counter value which is registered in a counter assigned to each of sub-areas in the Z-X plane where a converted point of a corresponding one of the bottom end points is situated. Thereby, positional distribution of each of the bottom end points is calculated. In the case of the present example, for instance, $P_11, P_21, P_31, P_41, P_51, P_61, P_71, P_81, P_91, P_{10}1, P_{11}1, P_{12}1$ and $P_{13}1$ are detected as bottom end points. Thus, +1 is added to a counter value registered in a counter assigned to each of sub-areas in which the converted points RB1 to RB13 of the respective bottom end points $P_11$ to $P_113$ are situated. Subsequently, an operation which is the same as that to be carried out in the foregoing embodiment is carried out. Thereby, lane boundary lines and three-dimensional objects can be detected, and a moving object can be detected from the three-dimensional objects thus detected.

After detecting the moving object, another operation which is the same as that to be carried out in the foregoing embodiment is carried out. Thereby, a pedestrian can be detected.

Figure 18:
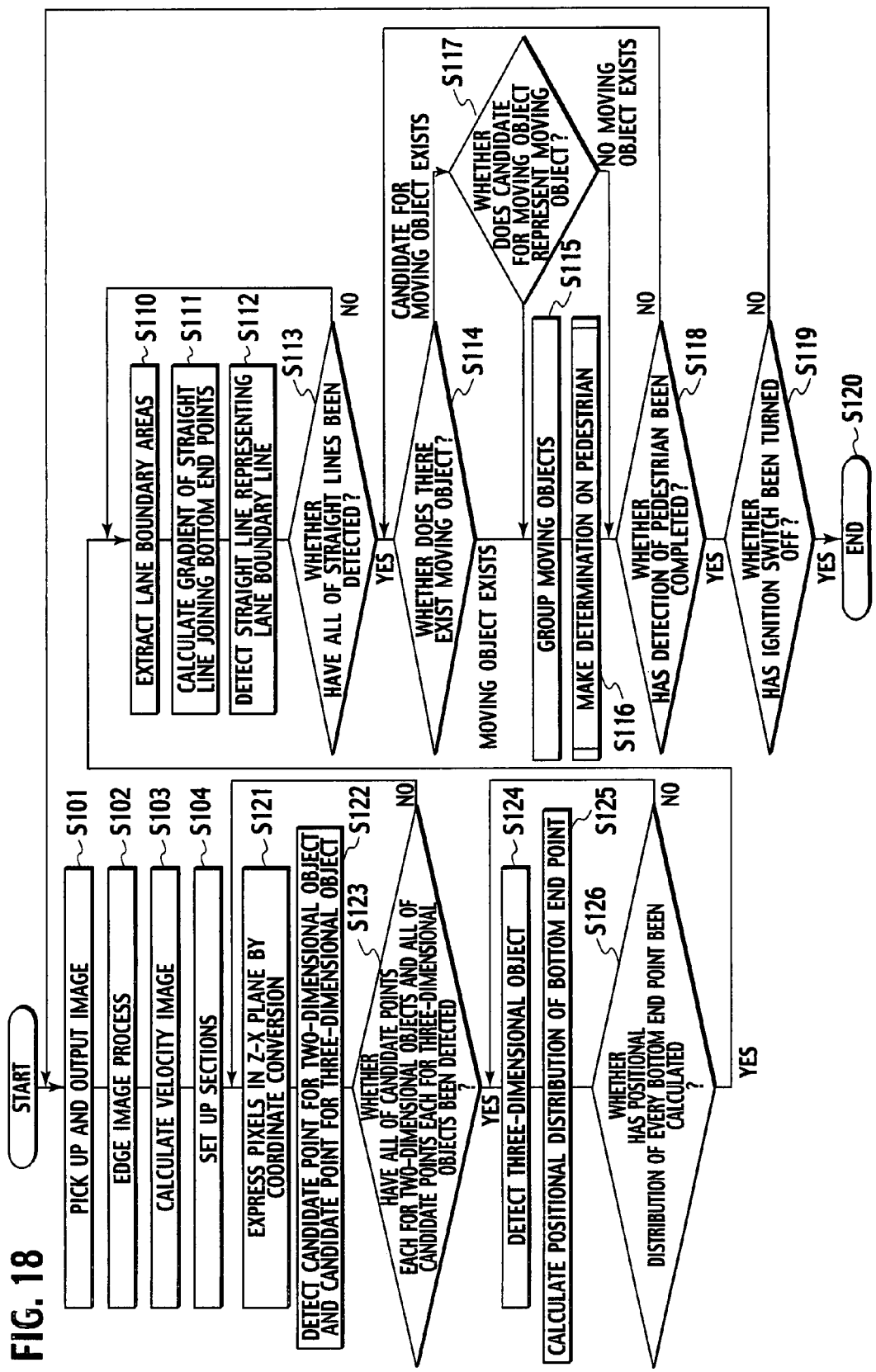
FIG. 18 is a flowchart of Example 3 of the present invention.

FIG. 18 is a flowchart showing a process to be carried out by the pedestrian detector 10 according to the present example.

The process shown in FIG. 18 is carried out as a program to be activated once the ignition switch is turned on. Some contents of the process in the flowchart shown in FIG. 18 are the same as those of the foregoing embodiment in the present invention shown in FIG. 11. The same contents are denoted by the same step numbers. Thereby, descriptions will be provided below chiefly for what makes contents of the process in the flowchart shown in FIG. 18 different from contents of the process in the flowchart shown in FIG. 11.

In step S121, the image is scanned from the bottom to the top in each of the sections, set up in step S104, for detecting an object. Pixels each having a velocity are expressed in the Z-X plane coordinate system obtained by coordinate conversion by use of Formulas 1 and 2. Subsequently, the flow proceeds to step S122.

In step S122, if a converted point of each of the pixels is situated in the Z-X plane, it is determined that the converted point of the pixel is a point representing a candidate for a two-dimensional object. If a converted point of each of the pixels is not situated in the Z-X plane, it is determined that the converted point is a point representing a candidate for a three-dimensional object. Thereafter, the flow proceeds to step S123.

In step S123, all of the pixels whose velocities have been calculated are expressed in the Z-X plane coordinate system obtained by coordinate conversion. Thus, it is determined whether or not detection of all of the points each representing a candidate for a two-dimensional object and all of the points each representing a candidate for a three-dimensional object has been completed. In a case where the detection of all of the points each representing a candidate for a two-dimensional object and all of the points each representing a candidate for a three-dimensional object has been completed, the flow proceeds to step S124. On the other hand, in a case where the detection of all of the points each representing a candidate for a two-dimensional object and all of the points each representing a candidate for a three-dimensional object has not been completed, the flow returns to step S121, where a point representing a candidate for a two-dimensional object and a point representing a candidate for a three-dimensional object are repeatedly detected.

In step S124, in a case where a point representing a candidate for a two-dimensional object and a point representing a candidate for a three-dimensional object exist next to each other in the vertical direction in each of the sections, it is determined that an object including the point representing the candidate for the two-dimensional object and the point representing the candidate for the three-dimensional object is a single three-dimensional object. Afterward, the flow proceeds to step S125.

In step S125, a point which is the lowermost among points each representing a candidate for a two-dimensional object in each of the sections is detected as the bottom end point. Thus, +1 is added to a counter value registered in a counter assigned to a sub-area in the Z-X plane in which a converted point of the detected bottom end point is situated. Subsequently, the flow proceeds to step S126.

In step S126, on the basis of the counter value, it is determined whether or not calculation of information on positional distribution of the bottom end point in each of the sections has been completed. In a case where the calculation of the information on positional distribution of the bottom end position in each of the sections has been completed, the flow proceeds to step S110. On the other hand, in a case the calculation of the information on positional distribution of the bottom end point in each of the sections has not been completed, the flow returns to step S124, where the information on positional distribution of the bottom end point is repeatedly calculated.

Afterward, the process which is the same as that to be carried out in the case of the foregoing embodiment is carried out. Thereby, a pedestrian is detected.

A pedestrian detector 10 according to an embodiment of the present invention makes it possible to obtain working-effects as follows.

The pedestrian detector 10 according to the embodiment of the present invention includes an image pickup unit 101 and a controller 100. The image pick up unit 101 is configured to pick up an image of the scene in front of the host vehicle. The controller 100 includes a characteristic point extractor 103, a movement information calculator 104, a coordinate converter 106, an object attribute determinator 107 and a pedestrian determinator 108. The characteristic point extractor 103 is configured to extract characteristic points from the image which has been picked up by the image pick up unit 101. The movement information calculator 104 is configured to calculate a velocity at which, and a direction in which, each of pixels representing the respective characteristic points extracted by the characteristic point extractor 103 moves in the image, and to output the velocity and the direction as movement information. The coordinate converter 106 is configured to express coordinates of each of the pixels in a coordinate system corresponding to an overhead view representing the image of the scene in front of the host vehicle obtained by coordinate conversion. The object attribute determinator 107 is configured to determine that the characteristic points represent either a two-dimensional object or a three-dimensional object on the basis of the coordinates of each of the pixels in the overhead view, and on the basis of the movement information on each of the pixels. In addition, in a case where it is determined that the characteristic points represent a three-dimensional object, the object attribute determinator 107 is configured to determine whether or not the three-dimensional object is a moving object. In a case where it is determined that the characteristic points represent a moving object, the pedestrian determinator 108 is configured to determine whether or not the moving object is a pedestrian on the basis of change in the velocity at which the moving object moves in the image.

On the basis of the movement information on each of the characteristic points which have been extracted from the image picked up by the camera 101 and the position of the characteristic point, this pedestrian detector 10 is capable of determining that the characteristic points represent either the two-dimensional object or the three-dimensional object. In addition, in the case where it is determined that the characteristic points represent a three-dimensional object, the pedestrian detector 10 is capable of determining whether or not the three-dimensional object is a moving object. In the case where it is determined that the characteristic points represent a moving object, the pedestrian detector 10 is capable of determining whether or not the moving object is a pedestrian on the basis of the change in the velocity at which the moving object moves. Thereby, the pedestrian detector 10 is capable of distinguishing a pedestrian with high accuracy.

In addition, the pedestrian detector 10 further includes a grouping unit 105 configured to group into a single group pixels which are next to each other in the vertical direction in the image, and which move at their respective velocities being within a predetermined range. The object attribute determinator 107 determines that the characteristic points represent either the two-dimensional object or the three-dimensional object on the basis of coordinates of each of the pixels, which are respectively situated uppermost and lowermost among the pixels grouped into the single group by the grouping unit 105, in the overhead view.

This pedestrian detector 10 is capable of: grouping into a single group pixels which are next to each other, and which move at their respective velocities equal to each other in the picked up image; thus finding pixels which are respectively situated uppermost and lowermost in the group; and thereby determining that the characteristic points represent any one of a two-dimensional object, a three-dimensional object and a moving object on the basis of coordinates of each of the pixels expressed in the coordinate system corresponding to the overhead view obtained by coordinate conversion. In this manner, the pedestrian detector 10 is capable of easily making the determination by use of the single image picked up by the camera 101.

A predetermined area of the overhead view is divided into a predetermined number of sub-areas. In a case where the pixels which are respectively situated uppermost and lowermost are situated in a single one of the multiple sub-areas, the object attribute determinator 107 of the pedestrian detector 10 determines that the characteristic points represent a two-dimensional object. In a case where the pixels which are respectively situated uppermost and lowermost are situated in mutually different ones of the multiple sub-areas, or in a case where the pixel which is situated uppermost are situated out of the sub-areas whereas the pixel which is situated lowermost is situated in any one of the sub-areas in the overhead view, the object attribute determinator 107 of the pedestrian detector 10 determines that the characteristic points represent a three-dimensional object.

This pedestrian detector 10 is capable of: grouping adjacent pixels, which move at their respective velocities almost equal to each other in the picked up image, into a single group; thus finding pixels which are respectively situated uppermost and lowermost in the group; and thereby determining whether the characteristic points represent a two-dimensional object, a three-dimensional object or a moving object on the basis of coordinates of each of the pixels expressed in the coordinate system corresponding to the overhead view obtained by coordinate conversion. In this manner, the pedestrian detector 10 is capable of easily making the determination by use of the single image picked up by the camera 101.

In the case of the pedestrian detector 10 according to Example 3, the object attribute determinator 107 determines that the pixels represent candidate points for a two-dimensional object when the pixels are situated in any one of the predetermined number of sub-areas obtained by dividing a predetermined area of the overhead view. On the other hand, the object attribute determinator 107 determines that the pixels represent candidate points for a three-dimensional object when the pixels are situated out of the sub-areas in the overhead view. Otherwise, the object attribute determinator 107 determines that the candidate point for a two-dimensional object and the candidate point for a three-dimensional object represent a single three-dimensional object when the candidate point for the two-dimensional object and the candidate point for the three-dimensional object are situated next to each other in the vertical direction in the image.

The pedestrian detector 10 is capable of accurately determining that pixels which serve as characteristic points, and which constitute a single object, represent a three-dimensional object even in a case where velocities at which the respective pixels move in the image are calculated to be not equal to each other due to some influence.

In the case of this pedestrian detector 10, the object attribute determinator 107 carries out a moving object determination for determining whether or not the three-dimensional object is a moving object on the basis of the movement information on each of the multiple pixels representing the three-dimensional object, and on the basis of the coordinates of each of the multiple pixels in the image.

This pedestrian detector 10 is capable of easily detecting a moving object on the basis of velocities of, and a positional relationship among, detected objects without assuming how the host vehicle moves, and without calculating the distance between the host vehicle and each of the detected objects.

In the case of this pedestrian detector 10, the object attribute determinator 107 detects lane boundary lines representing boundaries of a lane in which the host vehicle runs on the basis of coordinates of the pixel, which is situated lowermost in the vertical direction in the image among the pixels, in the overhead view, and thus carries out the moving object determination in each of zones which are defined by the lane boundary lines.

This pedestrian detector 10 is configured to detect a moving object in each of the zones which are defined by the detected lane boundary lines. Thereby, the pedestrian detector 10 is capable of easily detecting a moving object even in a complicated background.

In the case of the pedestrian detector 10, the pedestrian determinator 108 determines that the multiple moving objects represent a single moving object in a case where the multiple moving objects move in the same direction in the image while a ratio of velocities at which the respective multiple moving objects move is within a predetermined range, and concurrently in a case where the difference in coordinates among the multiple moving objects in the image is not larger than a predetermined value.

This pedestrian detector 10 is capable of determining a single moving object even in a case where multiple edges are detected from the single moving object.

In the case of this pedestrian detector 10, the pedestrian determinator 108 is characterized by determining that the moving object represents a pedestrian in a case where, when calculating the variance of the velocity at which the moving object moves, the variance is not smaller than a predetermined value.

The pedestrian detector 10 is capable of easily detecting a pedestrian by using the variance of the velocity, at which the detected moving object moves, as an index.

In the case of this pedestrian detector 10, the pedestrian determinator 108 determines that the moving object represents a pedestrian in a case where the variance of the velocity at which the moving object moves is smaller than the predetermined value, and concurrently in a case where change in the coordinates of the moving object in the image in a predetermined interval of time is not larger than a predetermined value while change in the velocity at which the moving object moves in the predetermined interval of time is not smaller than the predetermined value.

The pedestrian detector 10 is capable of easily detecting even a pedestrian who moves at a low velocity.

In the case of the pedestrian detector 10 according to Example 1, the pedestrian determinator 108 divides the moving object into an upper portion and a lower portion in the image, and thus calculates the variance of the velocity at which the lower portion of the moving object moves. In a case where the variance is not smaller than the predetermined value, the pedestrian determinator 108 determines that the moving object represents a pedestrian.

The pedestrian detector 10 is capable of easily detecting a pedestrian by using the variance of the velocity, at which the lower portion of the detected moving object moves, as an index.

In the case of the pedestrian detector 10 according to Example 1, the pedestrian determinator 108 determines that the moving object represents a pedestrian in a case where the variance of the velocity at which the lower portion of the moving object moves is smaller than the predetermined value, and concurrently in a case where the change in coordinates of the moving object in the image in the predetermined interval of time is not larger than the predetermined value while the change in the velocity at which the moving object moves is not smaller than the predetermined value.

The pedestrian detector 10 is capable of easily detecting even a pedestrian who moves at a low velocity.

In a case of a pedestrian detector 10 according to Example 2, the pedestrian determinator 108 detects a top end and a bottom end of the moving object, and calculates a maximum value of the velocity at which the top end moves and a maximum value of the velocity at which the bottom end moves. In a case where the ratio of the maximum value of the top end to the maximum value of the bottom end is out of a predetermined range, the pedestrian determinator 108 determines that the moving object represents a pedestrian.

This pedestrian detector 10 is capable of easily detecting a pedestrian by using as an index the ratio of the maximum value of the velocity at which the top end of the detected moving object moves to the maximum value of the velocity at which the bottom end of the detected moving object moves.

In the case of the pedestrian detector 10 according to Example 2, the pedestrian determinator 108 determines the moving object represents a pedestrian in the case where the ratio of the maximum value of the velocity at which the top end of the moving object moves to the maximum value of the velocity at which the bottom end of the moving object moves is within a predetermined range, and concurrently in a case where the change in coordinates of the moving object in the image in the predetermined interval of time is not larger than the predetermined value while the change in the velocity at which the moving object moves in the image in the predetermined interval of time is not smaller than the predetermined value.

The pedestrian detector 10 is capable of easily detecting even a pedestrian who moves at a low velocity.

In the case of the pedestrian detector 10, the characteristic points are edges of the object.

This pedestrian detector 10 is capable of easily detecting a pedestrian by detecting the edges of the object in the picked up image.

The detailed descriptions have been provided for the embodiment of the present invention with reference to the drawings. However, the embodiment merely illustrates an aspect of the present invention. The present invention is not limited to the configuration of the embodiment. It goes without saying that any modification, variation or the like of design within the scope not departing from the spirit of the present invention shall be included in the present invention.

For example, a block diagram shall not be limited to the block diagram shown in the foregoing embodiment. A configuration having a function equivalent to that of the embodiment serves for the purpose of the present invention.

In addition, a location in which a camera is mounted shall not be limited to the location described in the embodiment. Any location which directs the optical axis of the camera to the forward front of a host vehicle (to the Z-axis direction), and which causes the horizontal axis and the vertical axis of the surface of a picked up image to be set respectively in parallel with, and vertical to, the road surface serves for the purpose of the present invention.

Furthermore, when the width of a detected edge are going to be normalized, the number of pixels used for representing the width of the edge is not limited to three. The number of the pixels can be set up arbitrarily. In this case, it is desirable that the number of pixels used for representing the width of the edge be an odd-number. That is because a pixel representing the center of the width of the edge needs to be used in the subsequent process.

Moreover, the number of sections set up by dividing the x-y plane is not limited to what has been shown in the foregoing embodiment. An arbitrary number of sections can be used for dividing the x-y plane.

In addition, the number of Areas/sub-areas set up by dividing the Z-X plane is not limited to what has been shown in the foregoing embodiment. An arbitrary number of Areas/sub-areas can be used for dividing the Z-X plane.

Furthermore, the ranges respectively in the vertical direction and the horizontal direction of the Z-X plane can be set at arbitrary values.

Moreover, the descriptions have been provided for the foregoing embodiment by citing the example in which the pedestrian detector is mounted on a vehicle running on a lane. However, the pedestrian detector may be mounted on any moving object other than the vehicle.

Additionally, the descriptions have been provided for the foregoing embodiment by citing the example in which lane boundary lines to be detected are a curb, a white line, and a line along which an exterior wall and a road surface are joined to each other. However, the lane boundary lines to be detected shall not be limited to these. For example, a guardrail, a boundary between a parked vehicle and the road surface, and a boundary between a road surface and an area other than the road surface (for instance, a paddy field and a cultivated field) may be detected.

The scope of the invention being indicated by the claims, and all variations which come within the meaning of claims are intended to be embraced herein.

The present disclosure relates to subject matters contained in Japanese Patent Application No. 2006-143612, filed on May 24, 2006, the disclosures of which is expressly incorporated herein by reference in its entirety.

What is claimed is:

1. A pedestrian detector comprising:
an image pick up unit configured to pick up an image of a scene in front of a host vehicle; and
a controller including:
a characteristic point extractor configured to extract characteristic points from the image which has been picked up by the image pick up unit;
a movement information calculator configured to calculate a velocity at which, and a direction in which, each of pixels representing respective characteristic points moves in the image, and to output the velocity and the direction as movement information;
a coordinate converter configured to express coordinates of each of pixels in a coordinate system corresponding to an overhead view representing the image of the scene in front of the host vehicle obtained by coordinate conversion;
an object attribute determinator configured to determine that the characteristic points represent any one of a two-dimensional object or a three-dimensional object, and in a case where it is determined that the characteristic points represent the three-dimensional object, whether or not the three-dimensional object is a moving object, on the basis of the coordinates of each of the pixels in the overhead view, and on the basis of the movement information of each of the pixels; and
a pedestrian determinator configured to determine whether or not the moving object is a pedestrian on a basis of change in the velocity at which the moving object moves in the image in a case where it is determined that the characteristic points represent the moving object.

2. The pedestrian detector according to claim 1, wherein the pedestrian determinator calculates a variance of the velocity at which the moving object moves, and thus determines that the moving object is a pedestrian in a case where the variance is not smaller than a predetermined value.

3. The pedestrian detector according to claim 2, wherein the pedestrian determinator determines that the moving object is a pedestrian in a case where the variance of the velocity at which the moving object moves is smaller than the predetermined value, and concurrently in a case where change in the coordinates of the moving object in the image in a predetermined interval of time is not larger than a second predetermined value while change in the velocity at which the moving object moves in the image in the predetermined interval of time is not smaller than a third predetermined value.

4. The pedestrian detector according to claim 1, wherein the pedestrian determinator divides the moving object into an upper portion and a lower portion in the image, calculates a variance of a velocity at which the lower portion moves, and determines that the moving object is a pedestrian in a case where the variance is not smaller than a predetermined value.

5. The pedestrian detector according to claim 4, wherein the pedestrian determinator determines that the moving object is a pedestrian in a case where the variance of the velocity at which the lower portion of the moving object moves is smaller than the predetermined value, and concurrently in a case where the change in the coordinates of the moving object in the image in a predetermined interval of time is not larger than a second predetermined value while the change in the velocity at which the moving object moves in the image in the predetermined interval of time is not smaller than a third predetermined value.

6. The pedestrian detector according to claim 1, wherein the pedestrian determinator detects a top end and a bottom end of the moving object, calculates a maximum value of a velocity at which the top end moves and a maximum value of a velocity at which the bottom end moves, and thus determines that the moving object is a pedestrian in a case where a ratio of the maximum value of the top end to the maximum value of the bottom end is out of a predetermined range.

7. The pedestrian detector according to claim 6, wherein the pedestrian determinator determines that the moving object is a pedestrian in a case where the ratio of the maximum value of the velocity at which the top end of the moving object moves to the maximum value of the velocity at which the bottom end of the moving object moves is within the predetermined range, and concurrently in a case where the change in the coordinates of the moving object in the image in a predetermined interval of time is not larger than a predetermined value while the change in the velocity at which the moving object moves in the image in the predetermined interval of time is not smaller than another predetermined value.

8. The pedestrian detector according to claim 1,
further comprising a grouping unit configured to group into a single group pixels which are next to each other in a vertical direction in the image, and which move at their respective velocities within a predetermined range,
wherein the object attribute determinator determines that the characteristic points represent any one of a two-dimensional object and a three-dimensional object on a basis of coordinates of each of the pixels, which are respectively situated uppermost and lowermost among the pixels grouped into the single group by the grouping unit, in the overhead view.

9. The pedestrian detector according to claim 8, wherein:
the object attribute determinator determines that the characteristic points represent a two-dimensional object in a case where the pixels respectively situated uppermost and lowermost are situated in a single one of a plurality of sub-areas set up by dividing a predetermined area in the overhead view into a predetermined number of sub-areas, and the object attribute determinator determines that the characteristic points represent the three-dimensional object in a case where pixels respectively situated uppermost and lowermost are situated in mutually different ones of the sub-areas, or concurrently in a case where the pixel situated uppermost is situated out of the sub-areas in the overhead view whereas the pixel situated lowermost is situated in any one of the sub-areas in the overhead view.

10. The pedestrian detector according to claim 8, wherein;

the object attribute determinator determines that a corresponding one of the pixels represents a candidate point for a two-dimensional object in a case where the one pixel is situated in any one of a plurality of sub-areas set up by dividing a predetermined area in the overhead view into a predetermined number of sub-areas, the object attribute determinator determines that the one pixel represents a candidate point for a three-dimensional object in a case where the one pixel is situated out of the sub-areas in the overhead view, and the object attribute determinator determines that the candidate point for the two-dimensional object and the candidate point for the three-dimensional object represent the three dimensional object in a case where the candidate point for the two-dimensional object and the candidate point for the three-dimensional object are situated next to each other in the vertical direction in the image.

11. The pedestrian detector according to claim 1, wherein the object attribute determinator performs a moving object determination of determining whether or not the three-dimensional object represents a moving object on a basis of the movement information of a pixel of each of a plurality of three-dimensional objects, and on a basis of coordinates of the pixel in the image.

12. The pedestrian detector according to claim 11, wherein the object attribute determinator detects lane boundary lines indicating boundaries of a lane in which the host vehicle runs on the basis of the coordinates of the pixel, which is situated lowermost among the pixels in a vertical direction of the image, in the overhead view, and thus performs the moving object determination in each of zones divided by the lane boundary lines.

13. The pedestrian detector according to claim 1, wherein the object attribute determinator determines that a plurality of moving objects represent a single moving object in a case where the plurality of moving objects move in a same direction in the image while a ratio of velocities at which the plurality of moving objects move is within a predetermined range, and concurrently in a case where a difference in the coordinates among the plurality of moving objects in the image is not larger than a predetermined value.

14. The pedestrian detector according to claim 1, wherein the characteristic points are edges of the object.

15. A pedestrian detecting method comprising:

picking up an image of a scene in front of a host vehicle;

extracting characteristic points from the image which has been picked up;

calculating a velocity at which, and a direction in which, each of pixels representing respective characteristic points moves in the image, and outputting the velocity and the direction as movement information;

expressing coordinates of each of the pixels in a coordinate system corresponding to an overhead view representing the image of the scene in front of the host vehicle obtained by coordinate conversion;

determining whether the characteristic points represent any one of a two-dimensional object and a three-dimensional object, and in a case where it is determined that the characteristic points represent the three-dimensional object, whether or not the three-dimensional object is a moving object on a basis of the coordinates of each of the pixels in the overhead view, and on the basis of the movement information of each of the pixels; and determining whether or not the moving object is a pedestrian on a basis of change in the velocity at which the moving object moves in the image in a case where it is determined that the characteristic points represent the moving object.

* * * * *